US012624887B2

(12) United States Patent
Kim et al.

(10) Patent No.: US 12,624,887 B2
(45) Date of Patent: May 12, 2026

(54) REFRIGERATOR

(71) Applicant: SAMSUNG ELECTRONICS CO., LTD., Suwon-si (KR)

(72) Inventors: Inwon Kim, Suwon-si (KR); Byoungmok Kim, Suwon-si (KR); Wonseok Yang, Suwon-si (KR); Seongwoo Kim, Suwon-si (KR); Chomin Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 78 days.

(21) Appl. No.: 18/631,453

(22) Filed: Apr. 10, 2024

(65) Prior Publication Data

US 2024/0410641 A1 Dec. 12, 2024

Related U.S. Application Data

(63) Continuation of application No. PCT/KR2024/004048, filed on Mar. 29, 2024.

(30) Foreign Application Priority Data

Jun. 12, 2023 (KR) ........................ 10-2023-0075150
Jul. 26, 2023 (KR) ........................ 10-2023-0097810

(51) Int. Cl.
*F25D 23/02* (2006.01)
*E05F 1/12* (2006.01)

(52) U.S. Cl.
CPC .......... *F25D 23/028* (2013.01); *E05F 1/1246* (2013.01); *E05Y 2900/31* (2013.01); *F25D 2323/024* (2013.01)

(58) Field of Classification Search
CPC ......... E05Y 2201/412; E05Y 2201/638; E05Y 2201/626; E05Y 2201/688; E05Y 2201/41;

(Continued)

(56) References Cited

U.S. PATENT DOCUMENTS 3,722,937 A * 3/1973 Stoeckl .................... E05C 19/02 292/79
5,522,656 A * 6/1996 Jenkins ................. E05F 1/1246 292/79

(Continued)

FOREIGN PATENT DOCUMENTS

CN 102687070 A 9/2012
JP 2004-52454 2/2004

(Continued)

OTHER PUBLICATIONS

International Search Report dated Jul. 18, 2024 for International Application No. PCT/KR2024/004048.

(Continued)

*Primary Examiner* — Hiwot E Tefera
(74) *Attorney, Agent, or Firm* — STAAS & HALSEY LLP

(57) ABSTRACT

A refrigerator including a main body with a storage room inside; a door to open and close the storage room; a lever device on the door and including a case, a rotatable lever coupled to the case, and a spring inside the case; a cam on the main body and including a cam face with first and second contact surfaces with an inflection point therebetween. While the door is being rotated to close the storage room, an end of the lever is moved along the first contact surface and the lever is rotated in a first direction compressing the spring, the end of the lever then contacts the inflection point, and the end of the lever is then moved along the second contact surface and the lever is rotated in a second direction while an accumulated elastic force in the spring is transmitted to the door in the closing direction.

15 Claims, 15 Drawing Sheets

(58) Field of Classification Search
CPC ............... E05Y 2900/31; F25D 23/028; F25D 2323/024; F25D 23/02; F25D 23/00; Y10T 292/0884; E05D 11/1014; E05F 1/1246
See application file for complete search history.

(56) References Cited

U.S. PATENT DOCUMENTS

| | | | | | |
|---|---|---|---|---|---|
| 5,579,606 | A | 12/1996 | Kim | | |
| 8,944,540 | B2 | 2/2015 | Kim et al. | | |
| 9,095,214 | B2 * | 8/2015 | White | A47B 96/00 | |
| 9,599,393 | B2 * | 3/2017 | Jeon | F25D 23/065 | |
| 9,625,204 | B2 | 4/2017 | Kim et al. | | |
| 2006/0232176 | A1 * | 10/2006 | Kim | E05D 7/081 | 312/401 |
| 2008/0203739 | A1 * | 8/2008 | Lim | E05C 19/04 | 292/340 |
| 2009/0273264 | A1 * | 11/2009 | Butler | F25D 23/028 | 312/405 |
| 2013/0264930 | A1 * | 10/2013 | Kim | E05F 1/00 | 312/405 |
| 2014/0145576 | A1 * | 5/2014 | White | E05F 1/1253 | 312/319.1 |
| 2015/0260443 | A1 * | 9/2015 | Lee | E05C 3/14 | 312/405 |
| 2015/0260445 | A1 * | 9/2015 | Kim | E05D 7/04 | 312/405 |
| 2020/0271372 | A1 * | 8/2020 | Fei | E05F 3/104 | |
| 2023/0304726 | A1 * | 9/2023 | Lee | E05D 7/081 | |

FOREIGN PATENT DOCUMENTS

| | | | | |
|---|---|---|---|---|
| JP | 2006-64341 | | 3/2006 | |
| JP | 2007-221335 | | 8/2007 | |
| KR | 0142007 | | 3/1998 | |
| KR | 10-0142057 | | 7/1998 | |
| KR | 0169349 | | 1/1999 | |
| KR | 2001-0003886 | | 1/2001 | |
| KR | 20060099353 | A * | 9/2006 | F21V 17/166 |
| KR | 10-2006-0109585 | | 10/2006 | |
| KR | 10-0747925 | | 8/2007 | |
| KR | 10-0776627 | | 11/2007 | |
| KR | 10-2008-0079113 | | 8/2008 | |
| KR | 10-2010-0131919 | | 12/2010 | |
| KR | 10-2013-0114963 | | 10/2013 | |
| KR | 10-1522186 | | 5/2015 | |
| KR | 10-2015-0102417 | | 9/2015 | |
| KR | 10-2021-0102539 | | 8/2021 | |
| WO | WO-2021177476 | A1 * | 9/2021 | F25D 23/028 |
| WO | WO-2022030835 | A1 * | 2/2022 | E05F 3/20 |

OTHER PUBLICATIONS

Written Opinion of the International Searching Authority dated Jul. 18, 2024 for International Agglication No. PCT/KR2024/004048.

* cited by examiner

REFRIGERATOR

CROSS-REFERENCE TO RELATED APPLICATIONS

This application is a continuation application, under 35 U.S.C. § 111(a), of International Application No. PCT/KR2024/004048, filed on Mar. 29, 2024, which claims priority under 35 U.S.C. § 119 to Korean Patent Application 10-2023-0075150, filed on Jun. 12, 2023, and Korean Patent Application 10-2023-0097810, filed on Jul. 26, 2023, in the Korean Intellectual Property Office, the disclosures of which are incorporated by reference herein in their entireties.

TECHNICAL FIELD

The disclosure relates to a refrigerator that improves a closing force of a door by using elastic force of a spring.

BACKGROUND ART

In general, a refrigerator, an appliance for keeping food fresh, includes a main body having a storage compartment and a cold air supply device for supplying cold air to the storage compartment. The storage compartment includes a refrigerating compartment in which the food is kept refrigerated at a temperature of approximately 0° C. to 5° C., and a freezing compartment in which the food is kept frozen at a temperature of approximately 0° C. to −30° C. A door is provided on a front surface of the main body to open or close the storage compartment. The door is rotatably provided on the front surface of the main body to open or close the storage compartment.

After closing at a certain angle, the door may be closed by means of a door closer.

DISCLOSURE

Technical Problem

The present disclosure is directed to a refrigerator capable of improving a closing force of a door.

Further, the present disclosure is directed to a refrigerator having an improved closing force of a door by using an elastic force of a spring.

Further, the present disclosure is directed to a refrigerator having an improved door closing force to be completely closed without stopping during a door closing process.

Further, the present disclosure is directed to a refrigerator having an improved door closing force to allow a door to be closed with a small force.

Further, the present disclosure is directed to a refrigerator capable of visually identifying whether a door is open or closed by using an elastic force of a spring.

Technical tasks to be achieved in this document are not limited to the technical tasks mentioned above, and other technical tasks not mentioned will be clearly understood by those skilled in the art from the description below.

Technical Solution

Aspects of embodiments of the disclosure will be set forth in part in the description which follows and, in part, will be apparent from the description, or may be learned by practice of the presented embodiments.

According to an embodiment of the disclosure, a refrigerator includes a main body; a storage room in the main body; a door couplable to the main body so that, while the door is coupled to the main body, the door is rotatable to open and close the storage room; a lever device mountable on the door and including a case, a lever including a first end, and a second end couplable to the case so that, while the second end is coupled to the case, the lever is rotatable about the second end, and a spring arrangeable inside the case and couplable to the lever so that, while the spring is coupled to the lever, the spring is compressed and expanded according to a rotation of the lever; a cam mountable on the main body and including a cam face, and the cam face including a first contact surface, a second contact surface, and an inflection point between the first contact surface and the second contact surface; wherein, while the lever device is mounted on the door and the cam is mounted on the main body, the lever device and the cam are configured so that, while the door is being rotated to close the storage room, the first end of the lever contacts the cam and is moved along the cam face such that the first end of the lever is moved along the first contact surface and the lever is rotated in a first direction so as to compress the spring and accumulate an elastic force in the lever device, after the first end of the lever is moved along a length of the first contact surface, the first end of the lever contacts the inflection point, and, after the first end of the lever contacts the inflection point, the first end of the lever is moved along the second contact surface and the lever is rotated in a second direction, opposite to the first direction, so that the spring decompresses and the accumulated elastic force is transmitted to the door in a direction of rotating the door to close the storage room.

According to an embodiment of the disclosure, the cam face may protrude toward the lever device.

According to an embodiment of the disclosure, the door may be rotatable to a position at which the first end of the lever does not contact the cam while the storage room is open.

According to an embodiment of the disclosure, the door may include a first door, a second door, and a rotating bar coupled with the first door to rotate, in response to the first door rotating to open and close the storage room, so as to cover a gap between the first door and the second door while the storage room is closed.

According to an embodiment of the disclosure, the inflection point may be a portion of the cam face that protrudes maximally towards the lever device.

According to an embodiment of the disclosure, the lever device may include a support mounted within the case and supporting the spring.

According to an embodiment of the disclosure, the case may include a support mounting groove to which the support is mounted, and a rotation shaft to which the second end of the lever is coupled so that the lever is rotatable about the rotation shaft.

According to an embodiment of the disclosure, the support may include a mounting hole in the support mounting groove to receive a securing member, and a first support protrusion on which a first end of the spring is supported.

According to an embodiment of the disclosure, the lever may include a rotation hole through which the rotation shaft extends, a second support protrusion on which a second end of the spring is supported, and a roller at the first end of the lever to contact the cam face and move along the cam face.

According to an embodiment of the disclosure, the roller may include a plurality of grooves along an outer circumferential surface of the roller.

According to an embodiment of the disclosure, the spring may elastically bias the lever so that the roller maintains contact with the cam face while the roller is moved along the cam face.

According to an embodiment of the disclosure, the spring may be a compression spring.

According to an embodiment of the disclosure, the lever may include a roller at the first end of the lever and in contact with the cam face while the first end of the lever moves along the cam face. While the door is being rotated to close the storage room, the roller may be in contact with the first contact surface and is moved along the first contact surface towards the inflection point.

According to an embodiment of the disclosure, the spring may be compressed by rotation of the lever while the roller is moved along the first contact surface.

According to an embodiment of the disclosure, when the roller passes the inflection point and is moved along the second contact surface, the lever device may be configured to transmit the accumulated elastic force to the door in a direction of rotating the door to close the storage room.

According to the spirit of the present disclosure, a refrigerator includes a main body, a storage room disposed within the main body, a door rotatably coupled to the main body to open or close the storage room, a lever device mounted on the door and configured to accumulate an elastic force when the door is closed, and a cam mounted on the main body and having a cam face with which the lever device contacts. The cam face includes an inflection point that becomes a reference point for transmitting the elastic force accumulated by the compression spring to the door, a first contact surface with which the lever device is contacted prior to contacting the inflection point, wherein the first contact surface is a section in which the lever device is moved along the first contact surface to cause the compression spring to accumulate the elastic force, and a second contact surface with which the second contact surface is contacted after the lever device is contacted with the inflection point, wherein the second contact surface is a section in which the lever device moves along the second contact surface to transmit the elastic force accumulated by the compression spring to the door.

According to the spirit of the present disclosure, a refrigerator includes a main body, a storage room disposed within the main body, a door rotatably coupled to the main body to open or close the storage room, a lever device mounted on the door and configured to accumulate an elastic force when the door is closed and transmit the accumulated elastic force in a direction of closing the door, and a cam mounted on the main body and allowing the lever device to contact and accumulate the elastic force when the door is closed. The lever device may include a case, a support mounted inside the case, a lever rotatably secured inside the case and rotating in contact with the cam face when the door is closed, and a spring disposed between the support and the lever and compressed when the lever is rotated.

DESCRIPTION OF DRAWINGS

These and/or other embodiments of the disclosure will become apparent and more readily appreciated from the following description of the embodiments, taken in conjunction with the accompanying drawings of which.

MODES OF THE INVENTION

Figure 1:
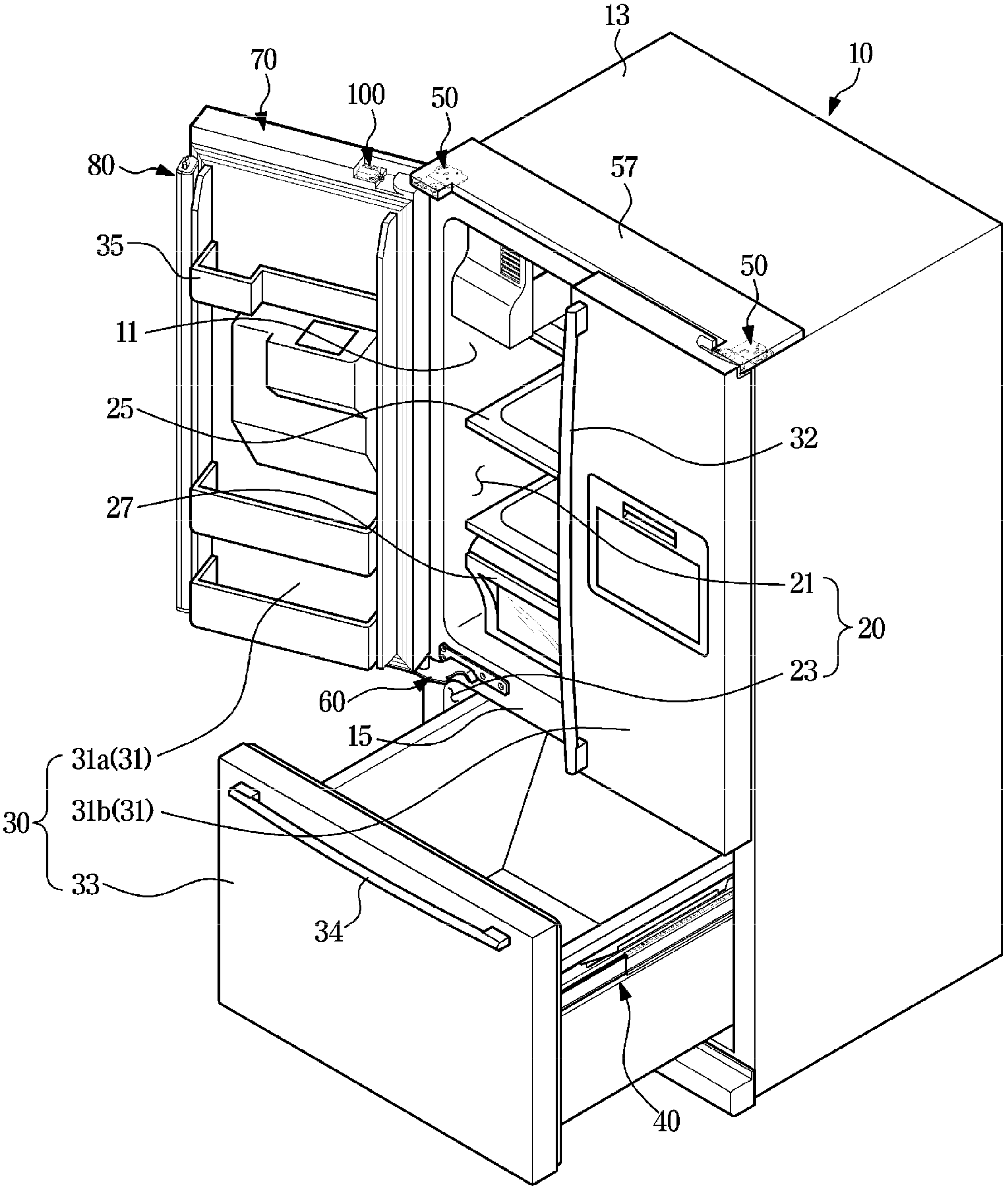
FIG. 1 is a perspective view illustrating a refrigerator with a first door and a freezing room door open, according to an embodiment of the present disclosure.

Various embodiments of the present document and terms used therein are not intended to limit the technical features described in this document to specific embodiments, and should be understood to include various modifications, equivalents, or substitutes of the corresponding embodiments.

In connection with the description of the drawings, similar reference numerals may be used for similar or related components.

The singular form of a noun corresponding to an item may include one or a plurality of the items unless clearly indicated otherwise in a related context.

In this document, phrases, such as "A or B", "at least one of A and B", "at least one of A or B," "A, B or C," "at least one of A, B and C," and "at least one of A, B, or C", may include any one or all possible combinations of items listed together in the corresponding phrase among the phrases.

As used herein, the term "and/or" includes any and all combinations of one or more of associated listed items.

Terms such as "1st", "2nd", "first", or "second" may be used simply to distinguish a component from other components, without limiting the component in other aspects (e.g., importance or order).

Further, as used in the disclosure, the terms "front", "rear", "top", "bottom", "side", "left", "right", "upper", "lower", and the like are defined with reference to the drawings, and are not intended to limit the shape and position of each component.

When a component (e.g., a first component) is referred to as "coupled" or "connected" to another component (e.g., a second component), with or without the terms "functionally" or "communicatively," it may refer to that the component may be connected to another component directly (e.g., wired), wirelessly, or through a third component.

It will be understood that when the terms "includes," "comprises," "including," and/or "comprising," when used in this specification, specify the presence of stated features, figures, steps, operations, components, members, or combinations thereof, but do not preclude the presence or addition of one or more other features, figures, steps, operations, components, members, or combinations thereof.

It will be understood that when a certain component is referred to as being "connected to", "coupled to", "supported by" or "in contact with" another component, it can be directly or indirectly connected to, coupled to, supported by, or in contact with the other component. When a component is indirectly connected to, coupled to, supported by, or in contact with another component, it may be connected to, coupled to, supported by, or in contact with the other component through a third component.

It will also be understood that when a component is referred to as being "on" or "over" another component, it can be directly on the other component or intervening components may also be present.

A refrigerator according to an embodiment of the disclosure may include a main body.

The "main body" may include an inner case, an outer case positioned outside the inner case, and an insulation provided between the inner case and the outer case.

The "inner case" may include a case, a plate, a panel, or a liner forming a storage room. The inner case may be formed as one body, or may be formed by assembling a plurality of plates together. The "outer case" may form an appearance of the main body, and be coupled to an outer side of the inner case such that the insulation is positioned between the inner case and the outer case.

The "insulation" may insulate inside of the storage room from outside of the storage room to maintain inside temperature of the storage room at appropriate temperature without being influenced by an external environment of the storage room. According to an embodiment of the disclosure, the insulation may include a foaming insulation. The foaming insulation may be molded by fixing the inner case and the outer case with jigs, etc. and then injecting and foaming urethane foam as a mixture of polyurethane and a foaming agent between the inner case and the outer case.

According to an embodiment of the disclosure, the insulation may include a vacuum insulation in addition to a foaming insulation, or may be configured only with a vacuum insulation instead of a forming insulation. The vacuum insulation may include a core material and a cladding material accommodating the core material and sealing the inside with vacuum or pressure close to vacuum. The vacuum insulation may further include an adsorbent for adsorbing a gas and water to stably maintain a vacuum state. However, the insulation is not limited to the above-mentioned foaming insulation or vacuum insulation, and may include various materials capable of being used for insulation.

The refrigerator according to an embodiment of the disclosure may include the storage room provided inside the main body to store food. The "storage room" may include a space defined by the inner case. The storage room may further include the inner case defining the space. One side of the storage room may open to enable a user to put food in or take food out. The storage room may store "food" therein. The food may include victual which humans eat and drink, and specifically, the food may include meat, fish, seafood, fruits, vegetables, water, ice, drinks, kimchi, alcoholic beverages such as wine, etc. However, medicines or cosmetics, as well as food, may be stored in the storage room, and goods that may be stored in the storage room are not limited.

The refrigerator may include one or more storage rooms. In a case in which two or more storage rooms are formed in the refrigerator, the respective storage rooms may have different purposes of use, and may be maintained at different temperature. To this end, the storage rooms may be partitioned by a partition wall including an insulation. According to an embodiment of the disclosure, the partition may be one portion of the main body. According to an embodiment of the disclosure, the partition may be provided independently from the main body and then assembled into the main body.

The storage room may be maintained within an appropriate temperature range according to a purpose of use, and include a "refrigerating room", a "freezing room", and a "temperature conversion room" according to purposes of use and/or temperature ranges. The refrigerating room may be maintained at appropriate temperature to keep food refrigerating, and the freezing room may be maintained at appropriate temperature to keep food frozen. The "refrigerating" may be keeping food cold without freezing the food, and for example, the refrigerating room may be maintained within a range of 0 degrees Celsius to 7 degrees Celsius. The "freezing" may be freezing food or keeping food frozen, and for example, the freezing room may be maintained within a range of −20 degrees Celsius to −1 degrees Celsius. The temperature conversion room may be used as any one of a refrigerating room or a freezing room according to or regardless of a user's selection. According to an embodiment of the disclosure, an area of the storage room may be used as a refrigerating room and the remaining area of the storage room may be used as a freezing room.

The storage room may also be called various other terms, such as "vegetable room", "freshness room", "cooling room", and "ice-making room", in addition to "refrigerating room", "freezing room", and "temperature conversion room", and the terms, such as "refrigerating room", "freezing room", "temperature conversion room", etc., as used below need to be understood to represent storage rooms having the corresponding purposes of use and the corresponding temperature ranges.

The refrigerator according to an embodiment of the disclosure may include at least one door configured to open or close the open side of the storage room. The respective doors may be provided to open and close one or more storage rooms, or a single door may be provided to open and close a plurality of storage rooms. The door may be rotatably or slidably mounted on the front of the main body.

The "door" may seal the storage room in a closed state. The door may include an insulation, like the main body, to insulate the storage room in the closed state.

According to an embodiment, the door may include an outer door plate forming the front surface of the door, an inner door plate forming the rear surface of the door and facing the storage room, an upper cap, a lower cap, and a door insulation provided therein.

A gasket may be provided on the edge of the inner door plate to seal the storage room by coming into close contact with the front surface of the main body when the door is closed. The inner door plate may include a dyke that protrudes rearward to allow a door basket for storing items to be fitted.

According to an embodiment, the door may include a door body and a front panel that is detachably coupled to the front of the door body and forms the front surface of the door. The door body may include an outer door plate that forms the front surface of the door body, an inner door plate that forms the rear surface of the door body and faces the storage room, an upper cap, a lower cap, and a door insulator provided therein.

The refrigerator may be classified as French Door Type, Side-by-side Type, Bottom Mounted Freezer (BMF), Top Mounted Freezer (TMF), or One Door Refrigerator depending on the arrangement of the doors and the storage rooms.

The refrigerator according to an embodiment of the disclosure may include a cold air supply device for supplying cold air to the storage room.

The "cold air supply device" may include a machine, an apparatus, an electronic device, and/or a combination system thereof, capable of generating cold air and guiding the cold air to cool the storage room.

According to an embodiment of the disclosure, the cold air supply device may generate cold air through a cooling cycle including compression, condensation, expansion, and evaporation processes of refrigerants. To this end, the cold air supply device may include a cooling cycle device having a compressor, a condenser, an expander, and an evaporator to drive the cooling cycle. According to an embodiment of the disclosure, the cold air supply device may include a semiconductor such as a thermoelectric element. The thermoelectric element may cool the storage room by heating and cooling actions through the Peltier effect.

The refrigerator according to an embodiment of the disclosure may include a machine room where at least some components belonging to the cold air supply device are installed.

The "machine room" may be partitioned and insulated from the storage room to prevent heat generated from the components installed in the machine room from being transferred to the storage room. To dissipate heat from the components installed inside the machine room, the machine room may communicate with outside of the main body.

The refrigerator according to an embodiment of the disclosure may include a dispenser provided on the door to provide water and/or ice. The dispenser may be provided on the door to allow access by the user without opening the door.

The refrigerator according to an embodiment of the disclosure may include an ice-making device that produces ice. The ice-making device may include an ice-making tray that stores water, an ice-moving device that separates ice from the ice-making tray, and an ice-bucket that stores ice generated in the ice-making tray.

The refrigerator according to an embodiment of the disclosure may include a controller for controlling the refrigerator.

The "controller" may include a memory for storing and/or memorizing data and/or programs for controlling the refrigerator, and a processor for outputting control signals for controlling the cold air supply device, etc. according to the programs and/or data memorized in the memory.

The memory may store or record various information, data, commands, programs, and the like necessary for operations of the refrigerator. The memory may store temporary data generated while generating control signals for controlling components included in the refrigerator. The memory may include at least one of volatile memory or non-volatile memory, or a combination thereof.

The processor may control the overall operation of the refrigerator. The processor may control the components of the refrigerator by executing programs stored in memory. The processor may include a separate neural processing unit (NPU) that performs an operation of an artificial intelligence (AI) model. In addition, the processor may include a central processing unit (CPU), a graphics processor (GPU), and the like. The processor may generate a control signal to control the operation of the cold air supply device. For example, the processor may receive temperature information of the storage room from a temperature sensor, and generate a cooling control signal for controlling an operation of the cold air supply device based on the temperature information of the storage room.

Furthermore, the processor may process a user input of a user interface and control an operation of the user interface according to the programs and/or data memorized/stored in the memory. The user interface may be provided using an input interface and an output interface. The processor may receive the user input from the user interface. In addition, the processor may transmit a display control signal and image data for displaying an image on the user interface to the user interface in response to the user input.

The processor and memory may be provided integrally or may be provided separately. The processor may include one or more processors. For example, the processor may include a main processor and at least one sub-processor. The memory may include one or more memories.

The refrigerator according to an embodiment of the disclosure may include a processor and a memory for controlling all the components included in the refrigerator, and may include a plurality of processors and a plurality of memories for individually controlling the components of the refrigerator. For example, the refrigerator may include a processor and a memory for controlling the operation of the cold air supply device according to an output of the temperature sensor. In addition, the refrigerator may be separately equipped with a processor and a memory for controlling the operation of the user interface according to the user input.

A communication module may communicate with external devices, such as servers, mobile devices, and other home appliances via a nearby access point (AP). The AP may connect a local area network (LAN) to which a refrigerator or a user device is connected to a wide area network (WAN) to which a server is connected. The refrigerator or the user device may be connected to the server via the WAN.

The input interface may include keys, a touch screen, a microphone, and the like. The input interface may receive the user input and pass the received user input to the processor.

The output interface may include a display, a speaker, and the like. The output interface may output various notifications, messages, information, and the like generated by the processor.

Hereinafter, various embodiments according to the disclosure will be described in detail with reference to the accompanying drawings.

FIG. 1 is a perspective view of a refrigerator with a first door and a freezing room door open, according to an embodiment.

As shown in FIG. 1, a refrigerator may include a main body 10, a storage room 20 disposed within the main body 10 and having an open front, a door 30 for opening or closing the open front of the storage room 20, a cold air supply device (not shown) for supplying cold air to the inside of the storage room 20.

The main body 10 may include an inner case 11 forming the storage room 20 and an outer case 13 forming the exterior thereof. An insulation (not shown) may be foamed between the inner case 11 and the outer case 13 and inside the door 30 to prevent cold air from leaking out of the storage room 20.

The main body 10 may include the cold air supply device for supplying cold air to the storage room 20. The cold air supply device may include a compressor, a condenser, an expansion valve, an evaporator, a blowing fan, a cold air duct, and the like.

A machine room (not shown) may be provided at a rear lower side of the main body 10 in which a compressor for compressing a refrigerant and a condenser for condensing the compressed refrigerant are installed.

An evaporator to generate cold air, a blowing fan to guide the cold air generated in the evaporator into the storage room 20, and a cold air duct to guide the cold air generated in the evaporator to the storage room 20 may be arranged on a rear wall of the storage room 20. The evaporator, the blowing fan, and the cold air duct may each comprise a plurality of units to independently supply cold air to the storage room 20.

The storage room 20 may be partitioned upward and downward by a partition wall 15. The storage room 20 may include a refrigerating room 21 located on an upper portion of the partition wall 15 and a freezing room 23 located on a lower portion of the partition wall 15. However, the above partitioning and use of the storage room 20 is only an example and may not be limited thereto.

The storage room 20 may be provided with a plurality of shelves 25 to divide the interior of the storage room 20 into a plurality of rooms. The storage room 20 may be provided with a plurality of storage containers 27 for storing food or the like.

The door 30 may open or close the storage room 20, which is provided to be front open. The door 30 may include a refrigerating room door 31 rotatably coupled to the main body 10 to open or close the refrigerating room 21. The refrigerating room door 31 may be provided as a side-by-side door (or French door). The door 30 may include a freezing room door 33 slidably coupled to the main body 10 to open or close the freezing room 23. The freezing room door 33 may be provided as a drawer door. Although drawings show the refrigerating room door 31 being provided as a side-by-side type door and the freezing room door 33 being provided as a drawer type door, but are not limited thereto. In other words, both the refrigerating room door 31 and the freezing room door 33 may be provided as a side-by-side doors. Furthermore, although the drawings show the refrigerating room 21 as being located on the upper portion of the freezing room 23, it is not limited thereto. Alternatively, the freezing room 23 may be located on the upper portion of the refrigerating room 21.

The refrigerating room door 31 may include a pair of doors 31*a* and 31*b*. The pair of doors 31*a* and 3*b* may include a first door 31*a* rotatably coupled to a front left side of the main body 10, and a second door 31*b* rotatably coupled to a front right side of the main body 10. The refrigerating room door 31 may include a refrigerating room door handle 32 for a user to grip to open or close the refrigerating room door 31. The refrigerating room door 31 may include a plurality of door baskets 35 mounted on a back surface of the refrigerating room door 31 to store food or the like.

The first door 31*a* may have a rotating bar 80 rotatably coupled thereto. When the first door 31*a* and the second door 31*b* are closed, a gap may be formed between the first door 31*a* and the second door 31*b*. The gap between the first door 31*a* and the second door 31*b* may allow cold air inside the refrigerating room 21 to leak out. The rotating bar 80 may rotate in response to the opening and closing of the first door 31*a* and may cover the gap between the first door 31*a* and the second door 31*b*. As a result, the rotating bar 80 may prevent cold air inside the refrigerating room 21 from leaking out through the gap between the first door 31*a* and the second door 31*b*.

The freezing room door 33 may include a freezing room door handle 34 for a user to grip to open or close the freezing room door 33. A sliding device 40 may be coupled to the freezing room door 33 and two side walls inside the freezing room 23 such that the freezing room door 33 slides relative to the main body 10.

The main body 10 may include hinge modules 50 and 60 for rotatably coupling the refrigerating room door 31 to the main body 10. The hinge modules 50 and 60 may include an upper hinge module 50 coupled to an upper portion of the main body 10 to allow the refrigerating room door 31 to be rotatably coupled to the main body 10. The hinge modules 50 and 60 may include a lower hinge module 60 coupled to the partition wall 15 to allow the refrigerating room door 31 to be rotatably coupled to the main body 10.

The refrigerator may include a door closer including a cam 200 mounted to the main body 10 and a lever device 100 mounted to the upper portion of the refrigerating room door 31.

The lever device 100 may be installed on the upper portion of the refrigerating room door 31, which contacts the cam 200 mounted on the main body 10 to accumulate an elastic force when the refrigerating room door 31 is closed. In other words, a lever 130 of the lever device 100 may contact the cam 200 in the process of closing the refrigerating room door 31, and consequently the lever 130 may rotate to compress a spring 140. As the spring 140 is compressed, the lever device 100 may accumulate an elastic force. When the lever 130 passes a certain section of the cam 200 in the process of closing the refrigerating room door 31, the lever 130 may rotate in a direction in which the compressed spring 140 is restored. At this time, as the compressed spring 140 is restored, the elastic force accumulated in the lever device 100 may be transmitted to the refrigerating room door 31 in a direction in which the freezing room door 31 is closed (See FIGS. 2 and 3).

The cam 200 with which the lever device 100 is contacted when the refrigerating room door 31 is closed may be mounted on the upper portion of the main body 10. The cam 200 may be provided with a cam face 210 against which the lever device 100 is contacted. When the refrigerating room door 31 is closed, the lever device 100 may accumulate elastic force by compressing the spring 140 as the lever 130 rotates in contact with the cam face 210. When the lever 130 passes a certain section of the cam face 210 in the process of closing the refrigerating room door 31, the lever 130 may rotate in the direction in which the compressed spring 140 is restored. At this time, as the compressed spring 140 is restored, the elastic force accumulated in the lever device 100 may be transmitted to the refrigerating room door 31 (See FIGS. 2 and 3).

A detailed description of the lever device 100 and the cam 200 will be provided below.

Although the drawings show the lever device 100 being mounted on the upper portion of the refrigerating room door 31 and the cam 200 being mounted on the upper hinge module 50 coupled to the upper portion of the main body 10, but the present disclosure is not limited thereto. In other words, the lever device 100 and the cam 200 may be mounted on the lower hinge module 60 coupled to the lower portion of the refrigerating room door 31 and the partition wall 15 of the main body 10.

Furthermore, the drawings show the lever device 100 being mounted on the upper portion of the refrigerating room door 31 and the cam 200 being mounted on the upper hinge module 50 coupled to the upper portion of the main body 10, but the present disclosure is limited thereto. In other words, the lever device 100 may be mounted on the upper hinge module 50 coupled to the upper portion of the main body 10 and the cam 200 may be mounted on the upper portion of the refrigerating room door 31.

Figure 2:
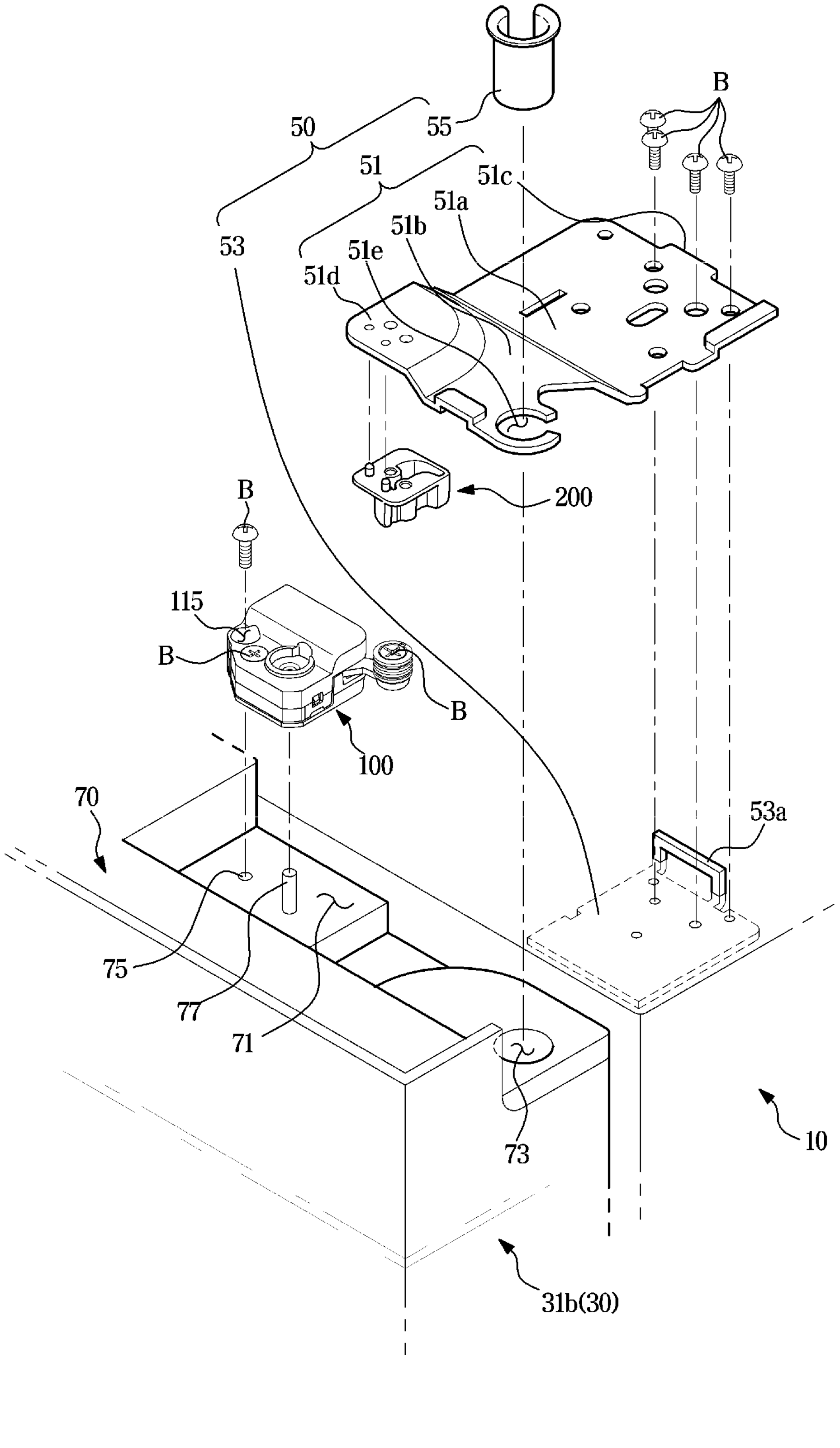
FIG. 2 is a view of a cam coupled to an upper hinge module and a lever device coupled to a door cap, according to an embodiment of the present disclosure.

FIG. 2 is a view illustrating the cam coupled to the upper hinge module and the lever device coupled to a door cap, according to an embodiment.

The positions of the refrigerating room 21 and the freezing room 23 may be altered depending on the use, and both the refrigerating room door 31 and the freezing room door 33 may be provided as side-by-side doors. Accordingly, hereinafter, the refrigerating room door 31, which is provided as side-by-side door, will be described as the door 30 (see FIG. 1).

As shown in FIG. 2, the upper hinge module 50 may include a bracket 51, a coupling member 53 secured to the upper portion of the main body 10 to allow the bracket 51 to be coupled to the main body 10, and a hinge shaft 55 for rotatably coupling the bracket 51 and the door 30 such that the door 30 is rotatably coupled to the main body 10.

The bracket 51 may include a base portion 51*a* coupled to the main body 10 and an extension portion 51*b* extending from the base portion 51*a* toward the door 30. The door 30 may be rotatably coupled to the extension portion 51*b*.

A rear end of the base portion 51*a* may be provided with a protrusion 51*c* that protrudes rearward and is inserted into and secured to a fastening portion 53*a* of the coupling member 53.

The extension portion 51*b* may be provide with a coupling portion 51*d* to which the cam 200 is coupled, and a through hole 51*e* through which the hinge axis 55, which allows the extension portion 51*b* and the door 30 to be rotatably coupled thereto, passes. The hinge shaft 55 passing through the through hole 51*e* may be coupled through a hinge hole 73 of a door cap 70 disposed on an upper portion of the door 30.

The coupling member 53 may be fixed to the upper portion of the main body 10, and be fastened to the base portion 51*a* of the bracket 51 and a fixing member B to allow the bracket 51 to be coupled to the main body 10. The fixing member B may be a screw. All fastening members B mentioned below may be screws.

A rear end of the coupling member 53 may be provided with the fastening portion 53*a* into which the protrusion 51*c* of the bracket 51 is fitted, to allow the bracket 51 to be secured to the coupling member 53 before the bracket 51 is fastened to the coupling member 53.

The hinge shaft 55 may be rotatably coupled to the upper portion of the door 30 so as to penetrate the through hole 51*e* of the bracket 51 and the hinge hole 73 of the door cap 70, thereby allowing the door 30 to be rotatably coupled to the main body 10.

The upper hinge module 50 may further include a hinge cover 57 (see FIG. 1) that is disposed at a front end of the upper portion of the main body 10 to cover an upper portion of the upper hinge module 50 to prevent the upper hinge module 50 from being exposed to the outside.

The door cap 70 may be disposed on the upper portion of the door 30. The door cap 70 may include a hinge receiving portion 71 in which the extension portion 51*b* of the bracket 51 is received.

The hinge receiving portion 71 may be provided with the hinge hole 73 through which the hinge shaft 55 is coupled, and the hinge hole 73 may be formed in a position corresponding to the through hole 51*e* provided in the extension portion 51*b* of the bracket 51 received in the hinge receiving portion 71.

The hinge receiving portion 71 may be coupled with the lever device 100 that is in contact with the cam 200 coupled to the bracket 51 and transmits a force to the door 30 in the direction of closing the door 30 when the door 30 is closed.

A lever device coupling hole 75 may be provided in the hinge receiving portion 71 for coupling the lever device 100. The lever device 100 may be provided with a coupling hole 115 corresponding to the lever device coupling hole 75, so that the lever device coupling hole 75 and the coupling hole 115 may be aligned and then fixed with the fixing member B.

Furthermore, the hinge receiving portion 71 may be provided with a guide protrusion 77 to guide a position of the lever device 100. The guide protrusion 77 may hold the lever device 100 to prevent the lever device 100 coupled to the hinge receiving portion 71 from moving.

Figure 3:
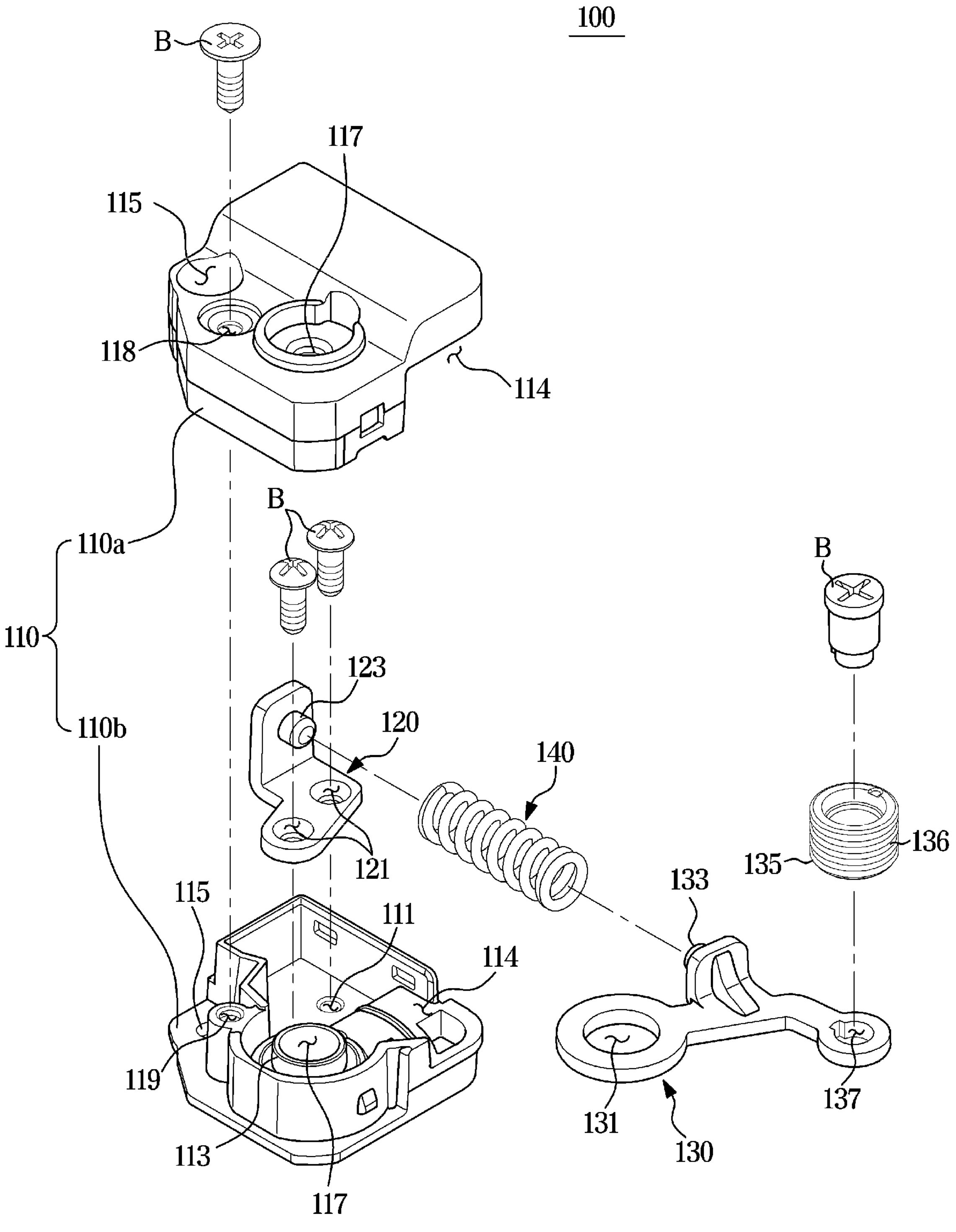
FIG. 3 is an exploded perspective view showing a lever mechanism according to an embodiment of the present disclosure.
Figure 4:
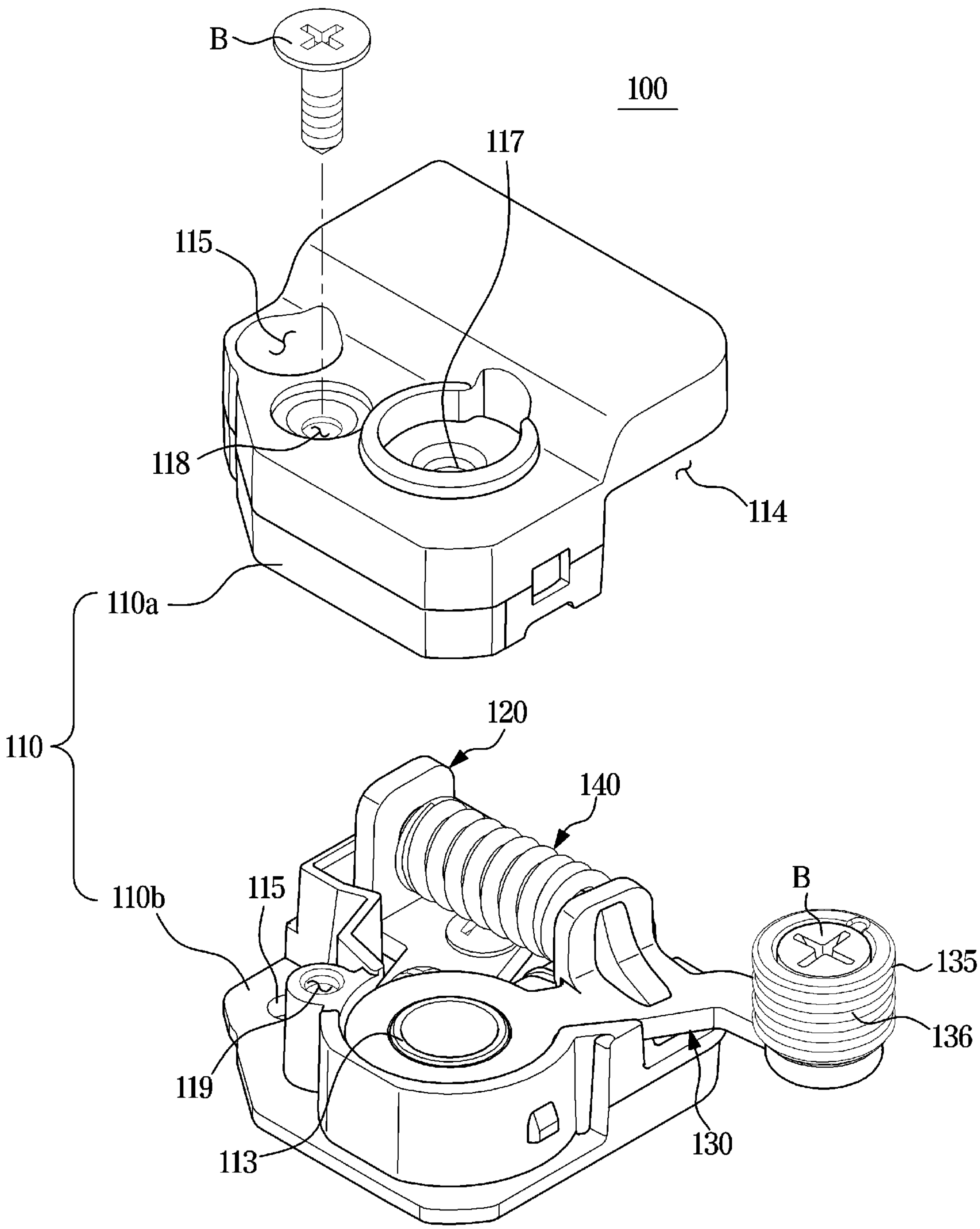
FIG. 4 is an exploded view of the lever device according an embodiment of the present disclosure, with a first case removed.
Figure 5:
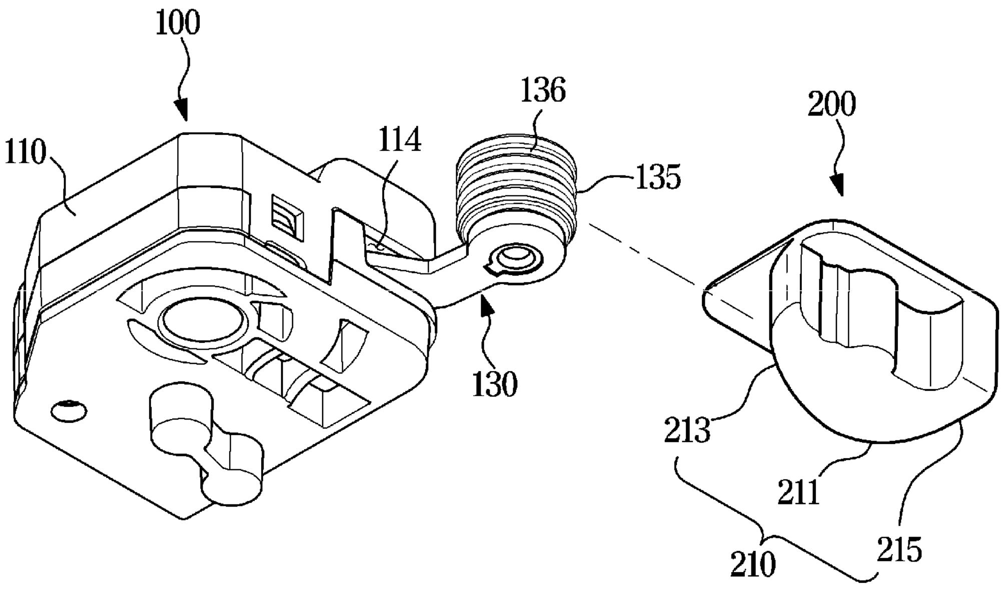
FIG. 5 is a view of the lever device and the cam according to an embodiment of the present disclosure.
Figure 6:
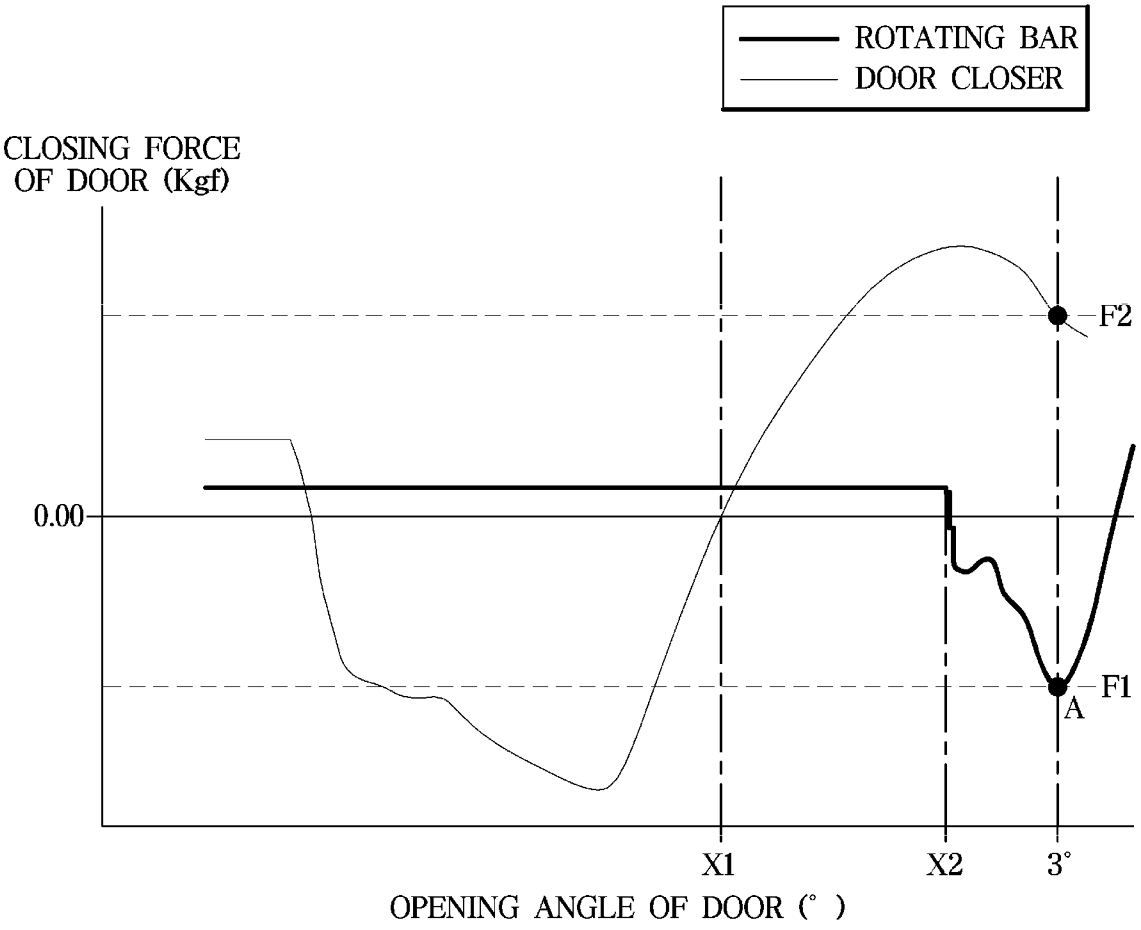
FIG. 6 is a graph illustrating a closing force of the door according to an opening angle α of the door when the opening angle α of the door is X1 at which a roller of a lever according to an embodiment of the present disclosure is positioned at an inflection point of a cam face, and the closing force of the door due to a frictional force generated by a rotating bar depending on the opening angle α of the door.

FIG. 3 is an exploded perspective view of the lever device according to an embodiment. FIG. 4 is a view illustrating a first case released from the lever device according to an embodiment. FIG. 5 is a view illustrating the lever device and the cam according to an embodiment. FIG. 6 is a graph illustrating a closing force of the door according to an opening angle α of the door when the opening angle α of the door is X1 at which a roller of the lever according to an embodiment is positioned at a point of inflection of the cam face, and the closing force of the door due to a frictional force generated by the rotating bar depending on the opening angle α of the door.

As shown in FIGS. 3 to 6, the lever device 100 may be mounted on the door cap 70 disposed on the upper portion of the door 30 (see FIG. 2). The lever device 100 may transmit a force to the door 30 in the direction of closing the door 30 when the door 30 is closed. In other words, the lever device 100 may cause the door 30 to close automatically when the door 30 is closed beyond a certain angle. When the door 30 is open, the lever device 100 may transmit a force to the door 30 (see FIG. 2) in a direction in which the door 30 opens. In other words, the lever device 100 may easily open the door 30 with only a small force when the door 30 is opened beyond a certain angle (see FIG. 2).

The lever device 100 may include a case 110. The case 110 may form the exterior of the lever device 100. The case 110 may include a first case 110*a* and a second case 110*b*. The first case 110*a* may be secured to an upper portion of the second case 110*b*. To secure the first case 110*a* and the second case 110*b*, a fixing hole 118 and a fixing groove 119 may be formed in the first case 110*a* and the second case 110*b*, respectively. The fixing member B passing through the fixing hole 118 may be fixed to the fixing groove 119, so that the first case 110*a* and the second case 110*b* may be fixed.

The case 110 may include support mounting grooves 111 in which a support 120 is mounted by the fixing member B. The support mounting grooves 111 may be formed as a pair. The support mounting grooves 111 may be formed in the second case 110*b*. The support 120 may include mounting holes 121 that are mounted in the support mounting grooves 111 by the fixing member B. The mounting holes 121 may be formed as a pair to correspond to the support mounting grooves 111.

The case 110 may include a rotation shaft 113 about which the lever 130 is rotatably coupled. The lever 130 may be rotatably coupled to the rotation shaft 113 such that, when the door 30 (see FIG. 2) is opened and closed, the lever 130 may be rotated around the rotation shaft 113.

The case 110 may include an opening 114 that is open to allow the lever 130 to be rotated about the rotation shaft 113. The lever 130, which is received in the case 110, may be partially exposed to the outside of the case 110 through the opening 114. The opening 114 may form a space for the lever 130 to be rotated about the rotation shaft 113. The lever 130 exposed to the outside of the case 110 through the opening 114 may be rotated about the rotation shaft 113 by contacting the cam face 210 of the cam 200 when the door 30 (see FIG. 2) is opened or closed.

The case 110 may include the coupling hole 115 coupled to the lever device coupling hole 75 of the door cap 70 by the fixing member B. The coupling hole 115 may be formed in the first case 110*a* and the second case 110*b*.

The case 110 may include an insertion hole 117 into which the guide protrusion 77 of the door cap 70 is inserted. The guide protrusion 77 may be inserted into the insertion hole 117, and thus the lever device 100 may be secured to an upper portion of the door cap 70. The insertion hole 117 may be formed in the first case 110*a* and the second case 110*b*.

The lever device 100 may include the support 120. The support 120 may be mounted within the case 110. The support 120 may include the mounting holes 121 that are mounted in the support mounting grooves 111 by the fixing member B. The support mounting grooves 111 and mounting holes 121 may be provided in pairs.

The support 120 may include a first support protrusion 123 on which one end of the spring 140 is supported. The spring 140 may be supported at opposite ends by the support 120 and the lever 130, respectively, within the case 110. The spring 140 may be supported at one end on the first support protrusion 123 of the support 120, which fixed inside the case 110, and at the other end on the lever 130, which is rotatably coupled to the rotation shaft 113 inside the case 110. When the door 30 (see FIG. 2) is opened and closed, the lever 130 may contact the cam face 210 and rotate about the rotation shaft 113 to compress the spring 140, or to allow the compressed spring 140 to be restored to its original length before the spring 140 was compressed. Although the drawings show one end of the spring 140 being supported by the first support protrusion 123 of the support 120, but is not limited thereto. In other words, one end of the spring 140 may be secured to a part other than the support 120 as long as the spring is fixed when the lever 130 is rotated. For example, one end of the spring 140 may be secured to the inside of the case 110. To enable one end of the spring 140 to be secured to the inside of the case 110, the first support protrusion 123 may be integrally provided inside the case 110. Once one end of the spring 140 is secured to the first support protrusion 123 inside the case 110, the lever device 100 may eliminate the support 120. Furthermore, although the drawings show the support 120 being provided separately and mounted inside the case 110, but is not limited thereto. Alternatively, the support 120 may be formed integrally with the case 110.

The lever device 100 may include the lever 130. The lever 130 may be rotatably coupled to the inside of the case 110. The lever 130 may include a rotation hole 131 rotatably coupled to the rotation shaft 113 of the case 110. When the door 30 (see FIG. 2) is opened and closed, the roller 130 may be rotated about the rotation shaft 113 by a roller 135 contacting the cam face 210 of the cam 200 and moving along the shape of the cam face 210.

In other words, when the door 30 (see FIG. 2) is being closed, the lever 130 may contact the cam face 210 after the door 30 (see FIG. 2) is closed more than a certain angle. When the door 30 (see FIG. 2) is further closed after the lever 130 contacts the cam face 210, the lever 130 may be moved along the cam face 210 and rotated about the rotation shaft 113. At this time, the cam face 210 may be a first contact surface 213. As the lever 130 is rotated about the rotation shaft 113, the spring 140 may be compressed by the rotation of the lever 130. When the spring 140 is compressed, the spring 140 may accumulate an elastic force. The spring 140 may be compressed until the lever 130 moves along the first contact surface 213 and is positioned at a point of inflection 211. While the door 30 (see FIG. 2) is being closed so that the spring 140 is compressed, and when the door 30 (see FIG. 2) is closed beyond a certain angle, that is, when the lever 130 is moved along a second contact surface 215 after being positioned at the inflection point 211 of the cam face 210, a direction of rotation of the lever 130 may be reversed, so that the compressed spring 140 may be restored to its original length before being compressed. When the spring 140 is restored, the elastic force accumulated in the spring 140 may be transmitted to the door 30 (see FIG. 2).

When the door 30 (see FIG. 2) is closed, the lever 130 may contact the cam face 210. At this time, the cam face 210 may be the second contact surface 215. When the door 30 (see FIG. 2) is opened while the lever 130 is in contact with the second contact surface 215, the lever 130 may be moved along the second contact surface 215 and rotated about the rotation shaft 113. As the lever 130 is rotated about the rotation shaft 113, the spring 140 may be compressed by the rotation of the lever 130. When the spring 140 is compressed, the spring 140 may accumulate an elastic force. The spring 140 may be compressed until the lever 130 is moved along the second contact surface 215 and positioned at the inflection point 211. When the door 30 (see FIG. 2) is opened so that the spring 140 is compressed and then the door 30 (see FIG. 2) is opened beyond a certain angle, that is, when the lever 130 is moved along the first contact surface 213 after being positioned at the inflection point 211 of the cam face 210, the direction of rotation of the lever 130 may be reversed, and the compressed spring 140 may be restored to its original length before being compressed. When the spring 140 is restored, the elastic force accumulated in the spring 140 may be transmitted to the door 30 (see FIG. 2). As described above, when the lever 130 is rotated about the rotation shaft 113, the spring 140 may be compressed or restored to the length before being compressed, depending on the direction of rotation of the lever 130.

The lever 130 may include a second support protrusion 133 on which the other end of the spring 140 is supported. The spring 140 may be supported at one end on the first support protrusion 123 of the support 120, which is secured within the case 110, and at the other end on the second support protrusion 133 of the lever 130, which is rotatably coupled to the rotation shaft 113 within the case 110. Accordingly, because one end of the spring 140 is secured to the support 120 when the lever 130 is rotated in response to the opening and closing of the door 30 (see FIG. 2), the other end may be compressed by the rotation of the lever 130, or may be restored to its length before being compressed.

The lever 130 may include the roller 135 that contacts the cam face 210 of the cam 200 when the door 30 (see FIG. 2) is opened and closed. The roller 135 in contact with the cam face 210 may move along the shape of the cam face 210 to cause the lever 130 to rotate about the rotation shaft 113. When the lever 130 rotates about the rotation shaft 113, the roller 135 may be moved by the elastic force of the spring 140 while maintaining contact with the cam face 210. Because the roller 135 is moved while maintaining contact with the cam face 210 when the lever 130 rotates about the rotation shaft 113, the spring 140 may be compressed more efficiently to accumulate the elastic force, and the elastic force of the spring 140 may be more efficiently transmitted to the door 30 (see FIG. 2) when the compressed spring 140 is restored to its restored to its length before the spring was compressed. In other words, the spring 140 may be compressed as the roller 135 moves along the cam face 210 while in contact with the cam face 210. Accordingly, the spring 140 may be compressed more when the roller 135 maintains contact with the cam face 210 as compared to when the roller 135 does not maintain contact with the cam face 210, due to the longer time the roller 135 maintains contact with the cam face 210. As a result, the door 30 (see FIG. 2) may have a greater closing force and/or opening force. In other words, the closing force and/or opening force of the door 30 (see FIG. 2) may be improved. The roller 135 may include a plurality of grooves 136 formed along an outer circumferential surface of the roller 135. By forming the plurality of grooves 136 on the outer circumferential surface of the roller 135, a contact area between the roller 135 and the cam face 210 may be reduced when the roller 135 is in contact with the cam face 210. As a result, a friction force between the roller 135 and the cam face 210 may be reduced (See FIG. 11).

The lever 130 may include a roller mounting hole 137 on which the roller 135 is mounted. The roller 135 may be rotatably mounted in the roller mounting hole 137 by the fixing member B.

The lever device 100 may include the spring 140. The spring 140 may have one end supported on the first support protrusion 123 of the support 120 secured within the case 110, and the other end supported on the second support protrusion 133 of the lever 130 rotatably coupled to the rotation shaft 113 within the case 110. Accordingly, when the lever 130 is rotated about the rotation shaft 113, the spring 140 may be compressed along the direction of rotation of the lever 130, or restored to the length before being compressed. When the spring is compressed by the lever 130, the spring 140 may accumulate the elastic force as much as the spring 140 is compressed and transmit the accumulated elastic force to the door 30 (see FIG. 2) when the compressed spring 140 is restored to the length before the spring was compressed.

The spring 140 may be a compression spring, so that the lever device 100 contacting the cam 200 may be formed as a single lever with elasticity, which allows the lever device 100 to have a large elastic force while having a small size compared to the case of using the material elasticity of the lever device 100. Accordingly, the lever device 100 using the elastic force of the spring 140 may transmit a greater force to the door 30. As a result, the closing force and/or opening force of the door 30 may be greater. In other words, the closing force and/or opening force of the door 30 may be improved, allowing the user to more visibly identify whether the door 30 is open and/or closed.

Furthermore, for the above reasons, the lever device 100 using the spring 140 may be freely shaped as required without being restricted in shape. In other words, in the case of where the lever device 100 is formed as a single lever having an elastic force, there may be a restriction on the shape because the elastic force becomes smaller when the size of the lever device 100 is reduced. However, when the lever device 100 includes the spring 140 and uses the elastic force of the spring 140, the elastic force of the lever device 100 may be increased and the shape may be freely formed. Since there are no restrictions in the shape of the lever device 100, the lever device 100 may be formed to have a shape that allows an angle of the door 30 to increase when the roller 135 is positioned at the inflection point 211. Here, the angle of the door 30 may be an angle between the main body 10 and the door 30, which may be an opening angle α of the door. The opening angle α of the door 30 when the roller 135 of the lever 130 is positioned at the inflection point 211 may be an angle at which the door 30 begins to close under the elastic force transmitted by the lever device 100. In other words, the opening angle α of the door 30 when the door 30 begins to close under the elastic force transmitted by the lever device 100 may be increased. In the process of closing the door 30, if a frictional force is generated between the rotating bar 80 provided with the door 30 and the main body 10 before the elastic force of the lever device 100 is transmitted to the door 30, that is, before the roller 135 of the lever 130 is positioned at the inflection point 211 of the cam face 210, the resistance due to the frictional force may cause the door 30 to stop stops before the door is completely closed. In other words, if the opening angle α of the door when the frictional force is generated between the rotating bar 80 and the main body 10 is larger than the opening angle α of the door when the roller 135 of the lever 130 is positioned at the inflection point 211 of the cam face 210, the resistance due to the friction force may cause the door 30 to stop before the door is completely closed. However, if the opening angle α of the door when the roller 135 of the lever 130 is positioned at the inflection point 211 of the cam face 210 is larger than the opening angle α of the door when the frictional force is generated between the rotating bar 80 and the main body 10, when closing of the door 30, the elastic force of the lever device 100 may be transmitted to the door 30 before the frictional force is generated between the rotating bar 80 provided with the door 30 and the main body 10. In other words, if the opening angle α of the door when the frictional force is generated between the rotation bar 80 and the body 10 is larger than the opening angle α of the door when the roller 135 of the lever 130 is positioned at the inflection point 211 of the cam face 210, the resistance caused by the frictional force may cause the door 30 to stop before it is fully closed.

However, if the opening angle α of the door when the roller 135 of the lever 130 is positioned at the inflection point 211 of the cam face 210 is larger than the opening angle α of the door when the frictional force is generated between the rotating bar 80 and the main body 10, when the door 30 is closed, the elastic force of the lever device 100 may be transmitted to the door 30 before the frictional force is generated between the rotating bar 80 provided with the door 30 and the main body 10. As a result, the door 30 may be completely closed without the door 30 being accelerated in the direction of closing before the frictional force is generated between the rotating bar 80 and the main body 10, to stop before the door 30 is completely closed (See FIG. 9).

Referring to the graph shown in FIG. 6, it can be seen that when the opening angle α of the door is X1 when the roller 135 of the lever 130 is positioned at the inflection point 211 of the cam face 210, a slope of the graph representing the closing force of the door 30 as a function of the opening angle α of the door becomes steeper, thereby applying an acceleration to the door 30 when the door 30 is closed. In this case, the opening angle α X1 of the door may be 10 to 15 degrees. In the drawings, X2 may be the opening angle α of the door at a time when friction between the main body 10 and the rotating bar 80 occurs. In this time, the opening angle α X2 of the door may be 4 degrees. In other words, it can be seen that a time when the roller 135 of the lever 130 is positioned at the inflection point 211 of the cam face 210 is faster than a time when the frictional force between the main body 10 and the rotating bar 80 is generated. That is, by setting the opening angle α of the door when the roller 135 of the lever 130 is positioned at the inflection point 211 of the cam face 210 to be 10 to 15 degrees, the opening angle α of the door when the roller 135 of the lever 130 is positioned at the inflection point 211 of the cam face 210 is greater than the opening angle α of the door when the frictional force is generated between the rotation bar 80 and the main body 10, which is 4 degrees. As a result, when the door 30 is closed, the elastic force of the lever device 100 may be transmitted to the door 30 before the frictional force is generated between the rotating bar 80 and the main body 10 provided in the door 30.

When the opening angle α of the door, which is the maximum resistance section A of the door 30 due to the friction between the main body 10 and the rotating bar 80, is 3 degrees, the closing force of the door 30 is F1 and at this time the closing force of the door 30 by the door closer may be F2. Although it may vary depending on the weight and/or height of the door 30, F1 may be approximately −1.0 to −2.0 kgf, and F2 may be approximately 2.0 to 2.3 kgf. That is, F2, the closing force of the door 30 by the door closer, is greater than F1, the closing force of the door 30 at which the opening angle α of the door is the maximum resistance section A of the door 30 due to the friction between the main body 10 and the rotating bar 80, is 3 degrees, the door 30 may overcome the frictional force between the main body 10 and the rotating bar 80 and close.

Furthermore, by setting the opening angle α of the door when the roller 135 of the lever 130 is positioned at the inflection point 211 of the cam face 210 to be 10 to 15 degrees, a range of difference between the closing force of the door 30 by the door closer at which the opening angle α of the door 30, which is the maximum resistance section A of the door 30, is 3 degrees and the closing force of the door 30 by the friction force between the main body 10 and the rotating bar 80 is increased. As a result, the obstruction that occurs when the roller 135 of the lever 130 passes the inflection point 211 of the cam face 210 and the elastic force of the spring 140 is transmitted to the door 30 may be reduced. In other words, the range of the closing force difference may be increased to overcome the closing force difference between the closing force of the door 30 at the moment when the frictional force between the main body 10 and the rotating bar 80 is maximum, and the closing force of the door 30 by the door closer. Accordingly, by setting the opening angle α of the door to be 10 to 15 degrees when the roller 135 of the lever 130 is positioned at the inflection point 211 of the cam face 210, the elastic force of the spring 140 may be transmitted to the door 30 as efficiently as possible, and the acceleration by the elastic force may overcome the resistance generated between the main body 10 and the rotating bar 80 (See FIGS. 2 and 9).

Furthermore, as described above, when the lever 130 rotates about the rotation shaft 113, the roller 135 may be moved while remaining in contact with the cam face 210 by the elastic force of the spring 140. Accordingly, the elastic force of the spring 140 may be more efficiently transmitted to the door 30 (see FIG. 2). This may result in the improved closing force and/or opening force of the door 30 (see FIG. 2).

The cam 200 may be mounted on the upper portion of the main body 10 (see FIG. 2). The cam 200 may be mounted on the upper hinge module 50 coupled to the upper portion of the main body 10 (see FIG. 2). The cam 200 may be coupled to the coupling portion **51*d* of the upper hinge module 50. The cam 200 may include the cam face 210 that contacts the roller 135 of the lever device 100 when the door 30 (see FIG. 2**) is closed.

The cam face 210 may be formed to protrude from one surface of the cam 200 against which the lever device 100 contacts. In other words, the cam face 210 may be formed to protrude towards the lever device 100 from one surface of the cam 200 against which the roller 135 of the lever device 100 contacts.

The cam face 210 may include the inflection point 211 that serves as a reference point for the spring 140 of the lever device 100 to accumulate an elastic force and then transmit the accumulated elastic force to the door 30 (see FIG. 2) when the door 30 (see FIG. 2) is being closed. The inflection point 211 may be a maximally protruding portion of the protruding cam face 210. When the door 30 (see FIG. 2) is being opened and closed, the lever device 100 may transmit the opening force or closing force to the door 30 (see FIG. 2) due to the elastic force of the spring 140 caused by the roller 135 of the lever device 100 passing over the inflection point 211.

The cam face 210 may include the first contact surface 213 that is contacted before the lever 130 is contacted at the inflection point 211 when the door 30 (see FIG. 2) is being closed. That is, when the door 30 (see FIG. 2) is being closed, the roller 135 of the lever 130 may contact the first contact surface 213 before contacting the inflection point 211. Conversely, when the door 30 (see FIG. 2) is being opened, the roller 135 of the lever 130 may contact the first contact surface after contacting the inflection point 211. When the door 30 (see FIG. 2) is being closed, the first contact surface 213 may be a section in which the lever device 100 accumulates the elastic force.

The cam face 210 may include the second contact surface 215 that is contacted after the lever 130 contacts the inflection point 211 when the door 30 (see FIG. 2) is being closed. That is, when the door 30 (see FIG. 2) is being closed, or closing, the roller 135 of the lever 130 may contact the second contact surface 215 after contacting the inflection point 211. Conversely, when the door 30 (see FIG. 2) is being opened, the roller 135 of the lever 130 may contact the second contact surface 215 before contacting the inflection point 211. When the door 30 (see FIG. 2) is being closed, the second contact surface 215 may be a section in which the lever device 100 transmits the elastic force to the door 30 (see FIG. 2).

The first contact surface 213 and the second contact surface 215 of the cam face 210 may be formed to be inclined in a direction opposite to the direction in which the cam face 210 is protruding based on the inflection point 211. Accordingly, the inflection point 211 may be the most protruding portion of the cam face 210 that protrudes in a triangular shape.

Figure 7:
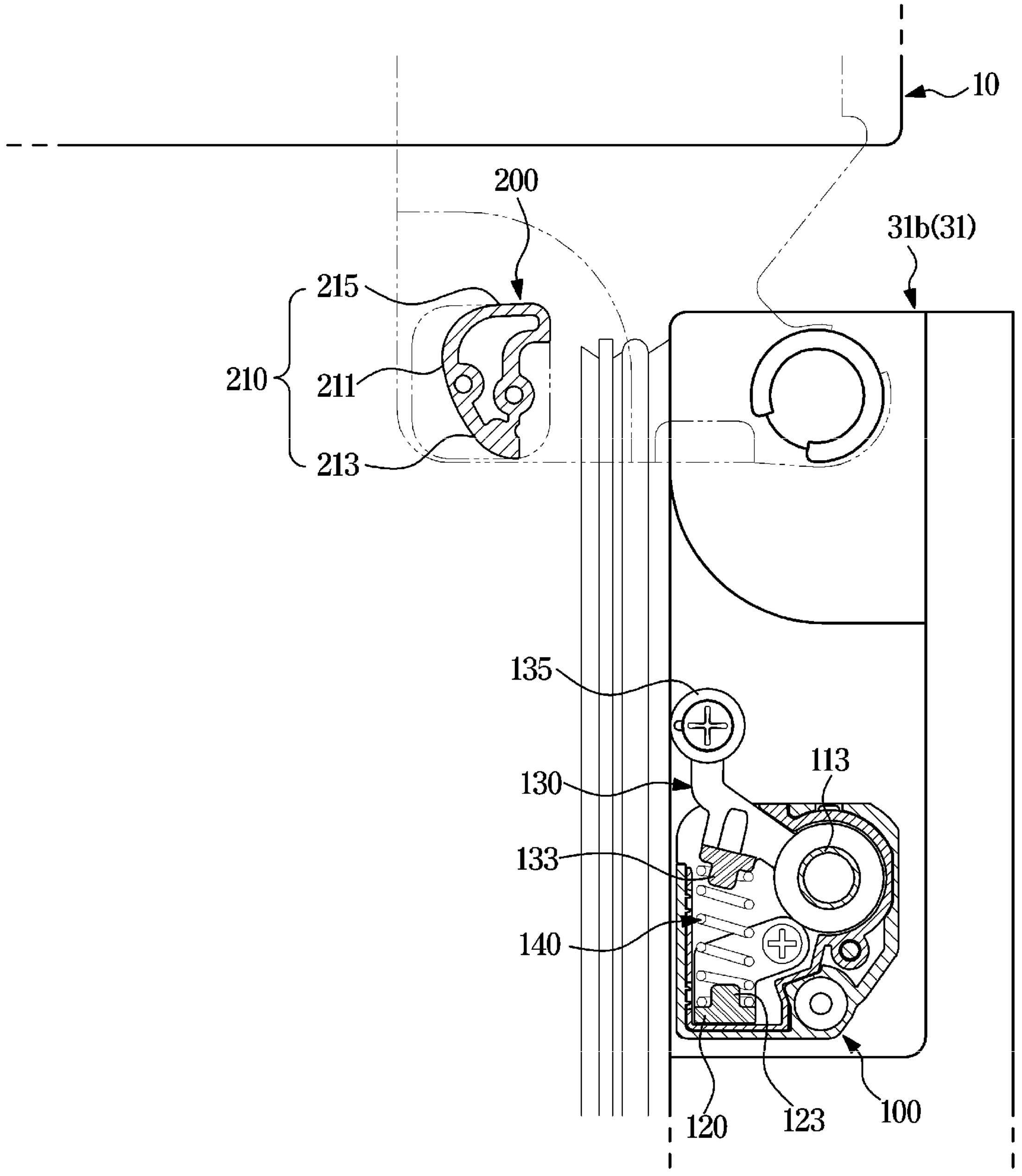
FIG. 7 is a view of the door fully open according to an embodiment of the present disclosure.
Figure 8:
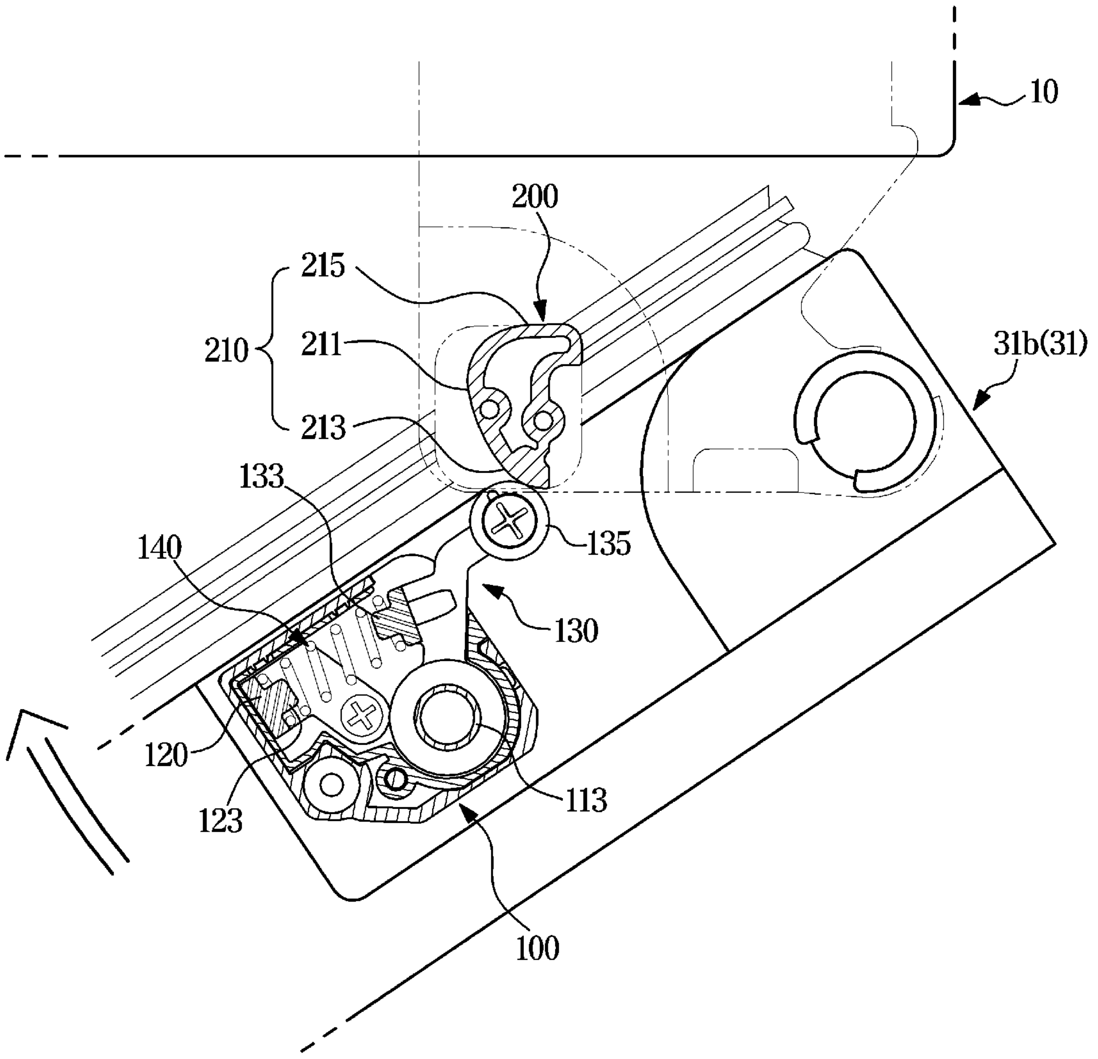
FIG. 8 is a view illustrating the roller of the lever device contacting a first contact surface of the cam face as the door is being closed according to an embodiment of the present disclosure.
Figure 9:
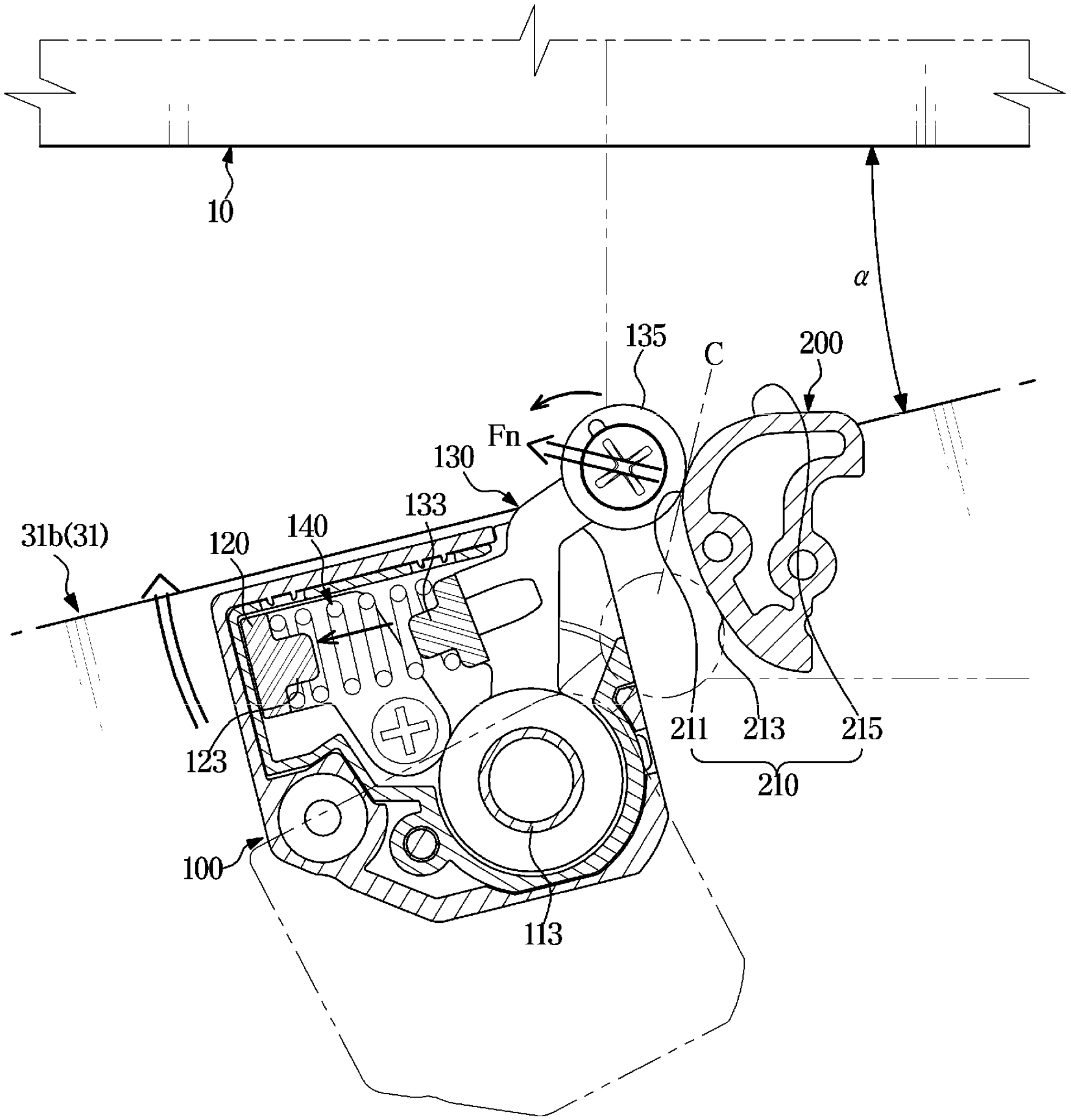
FIG. 9 is a view illustrating the roller of the lever device being moved to the inflection point along the first contact surface of the cam face in a process of closing of the door according to an embodiment of the present disclosure.
Figure 10:
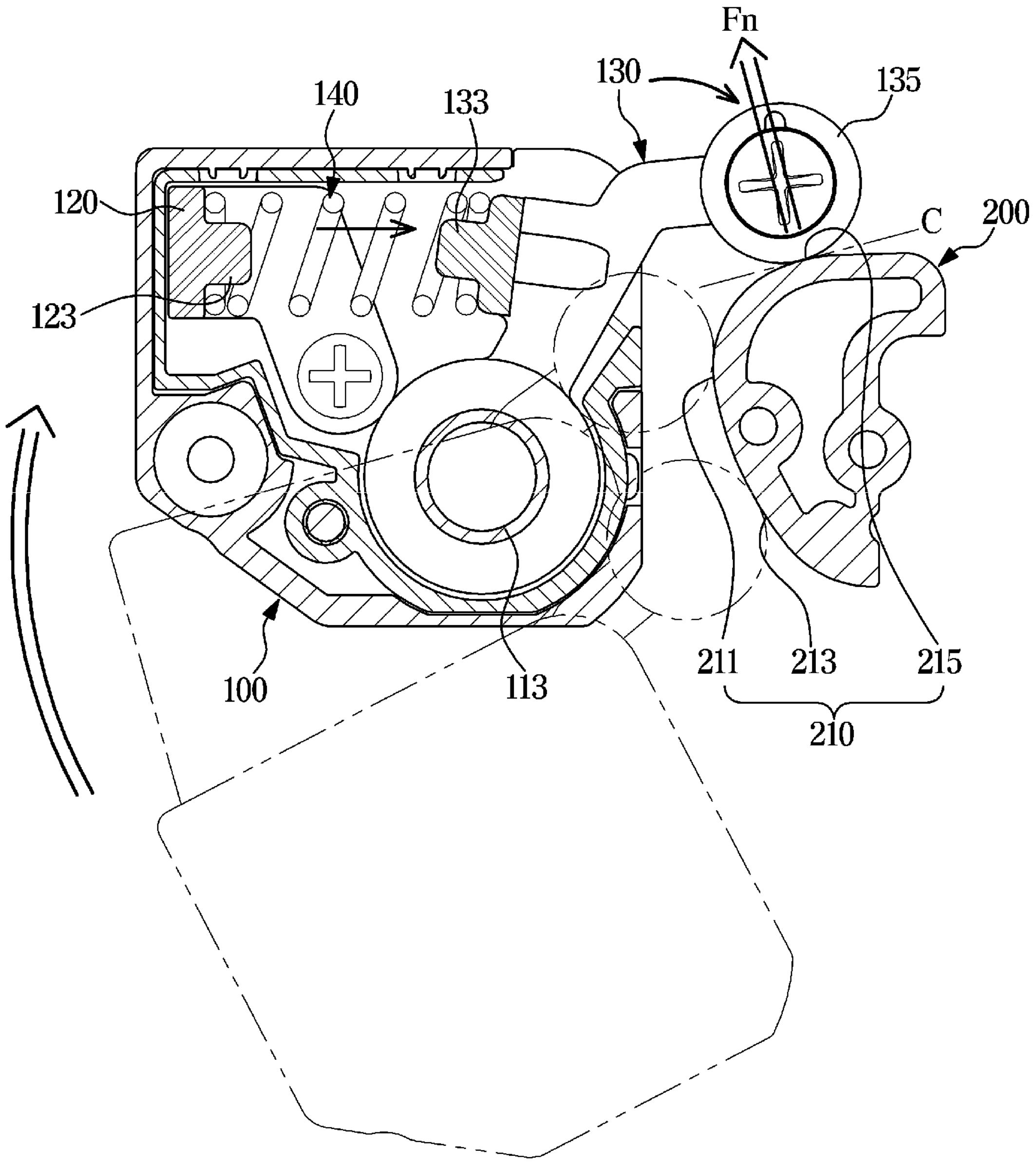
FIG. 10 is a view illustrating the roller of the lever device being moved along a second contact surface past the inflection point of the cam face in the process of closing the door according to an embodiment of the present disclosure.

FIG. 7 is a view of the door completely open according to an embodiment of the present disclosure. FIG. 8 is a view illustrating the roller of the lever device contacting the first contact surface of the cam face as the door according to an embodiment is being closed. FIG. 9 is a view illustrating the roller of the lever device being moved to the inflection point along the first contact surface of the cam face in the process of closing of the door according to an embodiment of the present disclosure. FIG. 10 is a view illustrating the roller of the lever device being moved along the second contact surface past the inflection point of the cam face in the process of closing the door according to an embodiment of the present disclosure.

FIGS. 7 to 10 illustrates only an operation of the lever device 100 when the second door 31*b* of the doors 30 is closed. However, since the operation of the lever device 100 when the first door 31*a* (see FIG. 1) and the second door 31*b* are closed is the same, the following will be described uniformly as the operation of the lever device 100 when the door 30 is closed.

When the door 30 is completely open, as shown in FIG. 7, and the door 30 is closed by at a certain angle, as shown in FIG. 8, the roller 135 of the lever device 100 may contact the first contact surface 213 of the cam face 210.

As the door 30 is further closed while the roller 135 of the lever device 100 is in contact with the first contact surface 213 of the cam face 210, as shown in FIG. 9, the roller 135 of the lever device 100 may move along the shape of the cam face 210. That is, the roller 135 of the lever device 100 may move along the shape of the first contact surface 213 towards the inflection point 211. As the roller 135 of the lever device 100 moves along the shape of the first contact surface 213 towards the inflection point 211, the lever 135 may be rotated counterclockwise about the rotation shaft 113 in the drawing. As the lever 135 is rotated counterclockwise about the rotation shaft 113, the spring 140 may be compressed. When the roller 135 of the lever device 100 passes through the first contact surface 213 and is positioned at the inflection point 211, the spring 140 may be maximally compressed.

When the spring 140 is maximally compressed by positioning the roller 135 of the lever device 100 at the inflection point 211 past the first contact surface 213, a repulsion force $F_n$ of the cam 200 due to the elastic force of the spring 140 may be generated in a direction perpendicular to the tangent C between the roller 135 and the cam face 210. When the roller 135 is positioned at the inflection point 211, the repulsion force $F_n$ of the cam 200 due to the elastic force of the spring 140 may be in a state of not transmitting any force to the door 30 in the direction of closing the door 30.

As the door 30 is further closed, as shown in FIG. 10, with the roller 135 of the lever device 100 positioned at the inflection point 211 and the spring 140 maximally compressed, the roller 135 of the lever device 100 may move beyond the inflection point 211. When the roller 135 of the lever device 100 exceeds the inflection point 211, the compressed spring 140 may be restored to the length before the spring was compressed and the lever 130 may be rotated clockwise about the rotation shaft 113 in the drawing. At this time, the roller 135 may be moved beyond the inflection point 211 and follow the shape of the second contact surface 215. When the elastic force of the spring 140 cause the lever 130 to rotate and the roller 135 is moved along the shape of the second contact surface 215 beyond the inflection point 211, the elastic force of the spring 140 may be transmitted to the door 30. In other words, the repulsion force $F_n$ of the cam 200 caused by the elastic force of the spring 140 generated in the direction perpendicular to the tangent C between the roller 135 and the cam face 210 may be transmitted to the door 30 in the direction in which the door 30 is closed. Accordingly, the door 30 may be completely closed by the closing force caused by the elastic force of the lever device 100 transmitted to the door 30. Since the door 30 is closed by the closing force by the elastic force of the lever device 100 after the door 30 is closed by a certain angle, the user may close the door 30 with a small force. Furthermore, the door 30 may be completely closed without stopping during the closing process.

Figure 11:
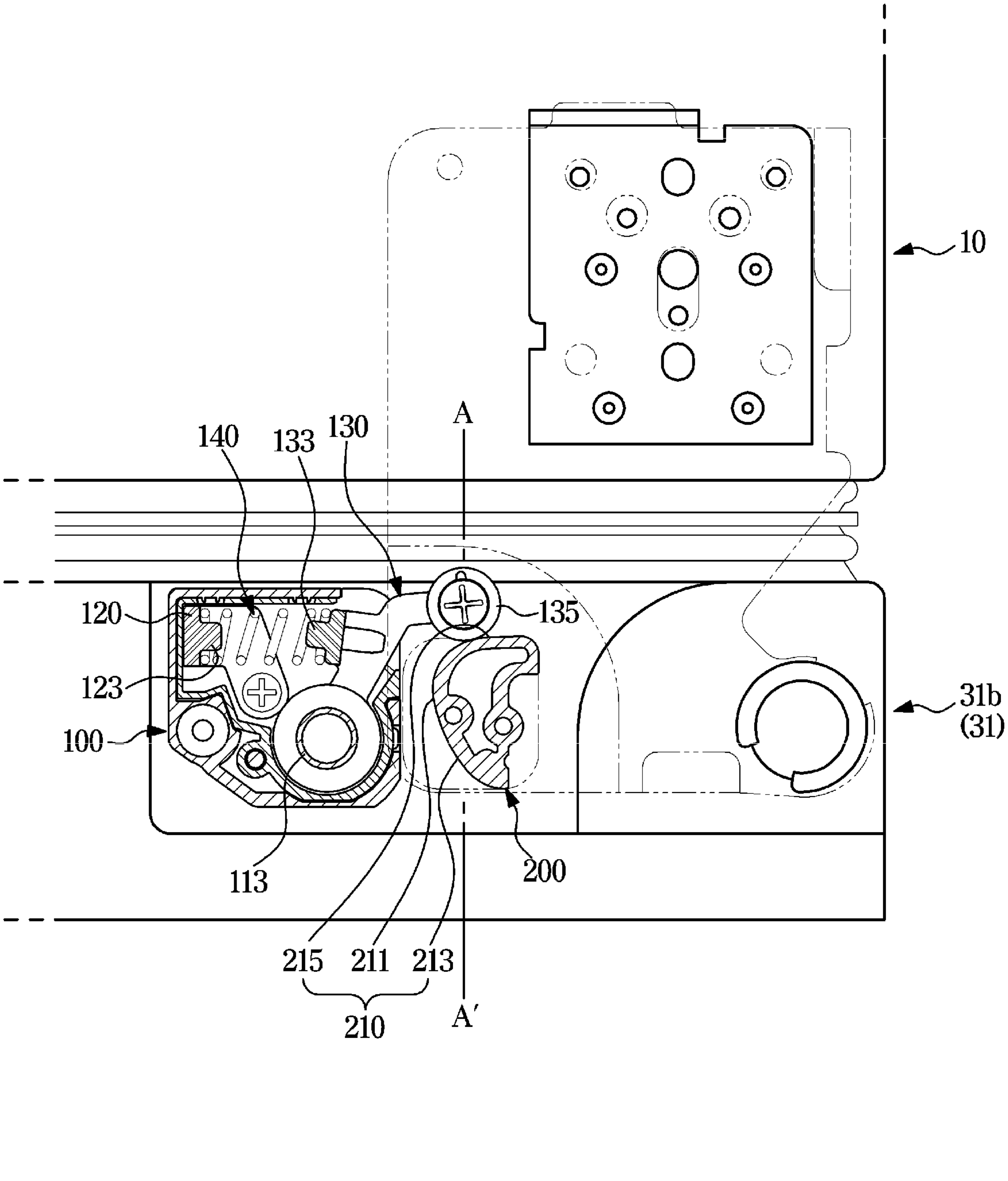
FIG. 11 is a view illustrating the completely closed door according to an embodiment of the present disclosure.
Figure 12:
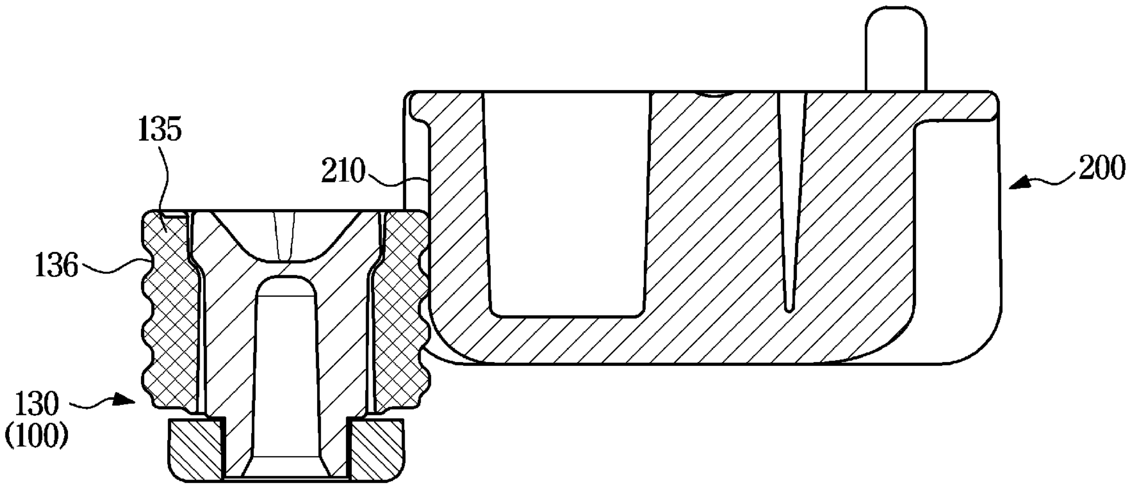
FIG. 12 is a cross-sectional view taken along A-A' of FIG. 11.
Figure 13:
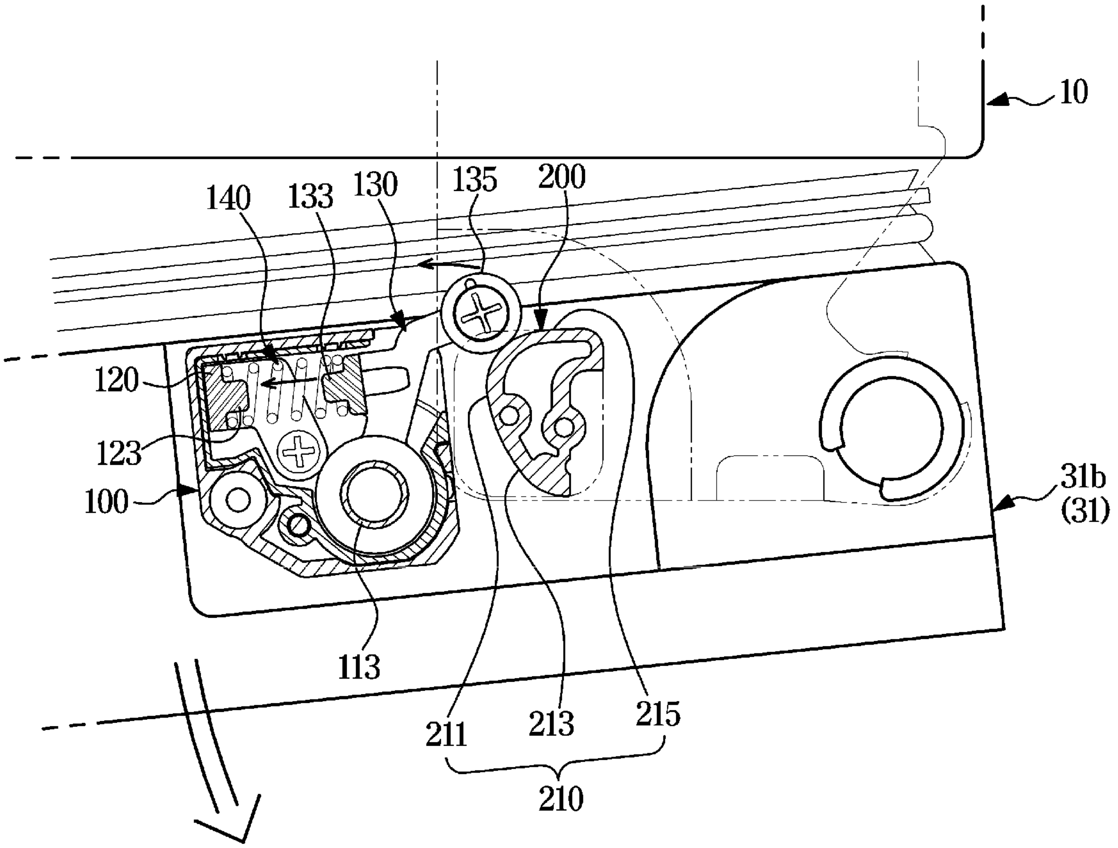
FIG. 13 is a view illustrating the roller of the lever device being moved along the shape of the second contact surface as the door is opened according to an embodiment of the present disclosure.
Figure 14:
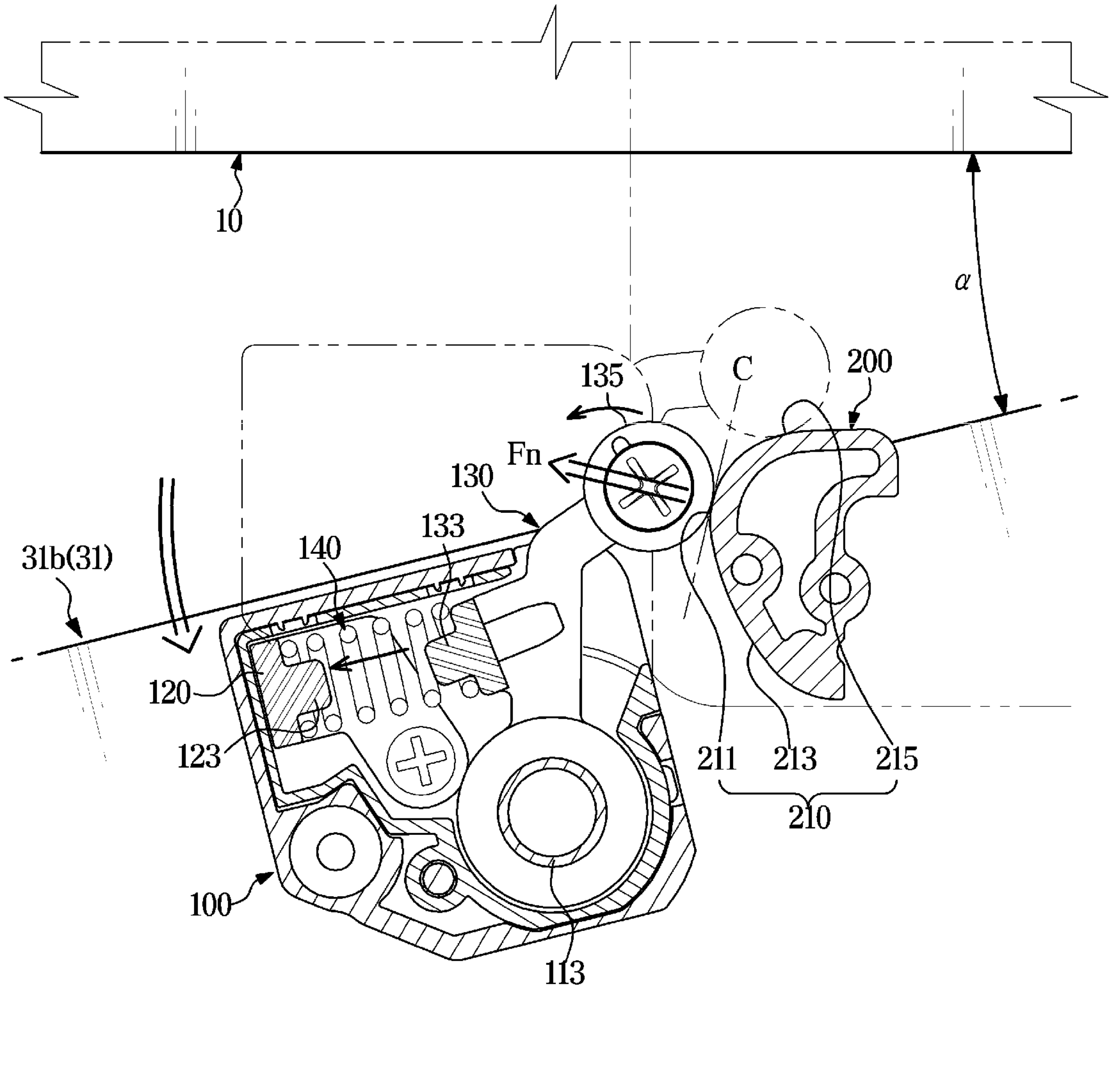
FIG. 14 is a view illustrating the roller of the lever device being moved to the inflection point along the shape of the second contact surface as the door is opened according to an embodiment of the present disclosure.
Figure 15:
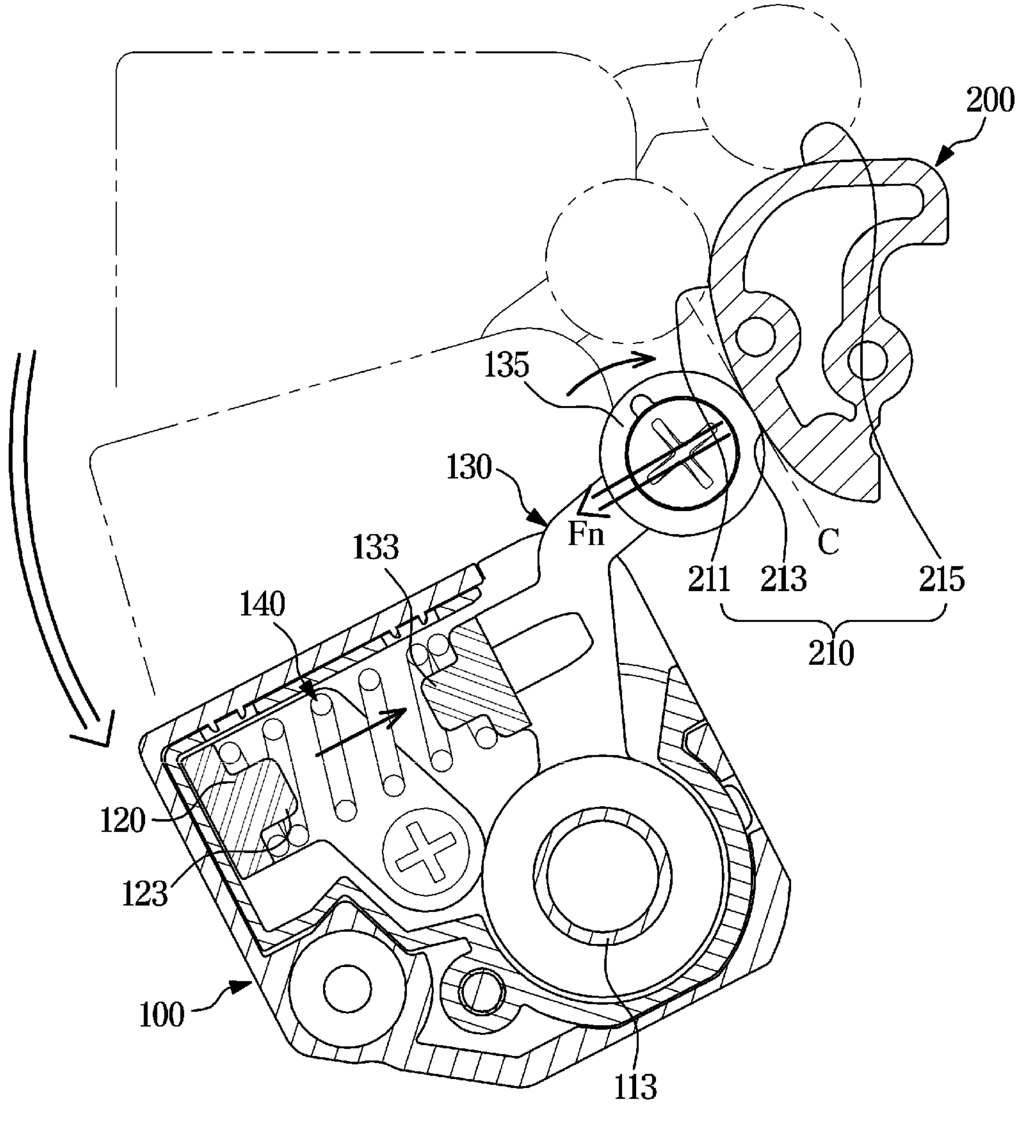
FIG. 15 is a view illustrating the roller of the lever device being moved along the first contact surface past the inflection point of the cam face in the process of opening the door according to an embodiment of the present disclosure.

FIG. 11 is a view showing the completely closed door according to an embodiment of the present disclosure. FIG. 12 is a cross-sectional view taken along A-A' of FIG. 11. FIG. 13 is a view showing the roller of the lever device being moved along the shape of the second contact surface as the door is opened according to one embodiment of the present disclosure. FIG. 14 is a view showing the roller of the lever device being moved to the inflection point along the shape of the second contact surface as the door is opened according to an embodiment of the present disclosure. FIG. 15 is a view showing the roller of the lever device being moved along the first contact surface past the inflection point of the cam face during the door opening process according to an embodiment of the present disclosure.

FIGS. 11 to 15 illustrate the operation of the lever device 100 when the second door 31*b* of the door 30 is opened. However, since the operation of the lever device 100 when the first door 31*a* (see FIG. 1) and the second door 31*b* are opened is the same, the following will be described uniformly as the operation of the lever device 100 when the door 30 is opened.

When the door 30 is completely closed, as shown in FIGS. 11 and 12, the roller 135 of the lever device 100 may be in contact with the cam face 210 of the cam 200. In detail, the roller 135 of the lever device 100 may be in a state of contact with the second contact surface 215 of the cam face 210.

When the door 30 is opened by a certain angle with the door 30 fully closed, as shown in FIG. 13, the roller 135 of the lever device 100 may be moved along the shape of the second contact surface 215 towards the inflection point 211. At this time, the lever 130 of the lever device 100 may be rotated counterclockwise about the rotation shaft 113 in the drawing. The spring 140 may be compressed by the rotation of the lever 130.

As the door 30 is further opened with the spring 140 compressed by the rotation of the lever 130, as shown in FIG. 14, the roller 135 of the lever device 100 may be positioned at the inflection point 211 past the second contact surface 215. When the roller 135 of the lever device 100 is positioned at the inflection point 211 past the second contact surface 215, the spring 140 may be maximally compressed.

When the spring 140 is maximally compressed by positioning the roller 135 of the lever device 100 at the inflection point 211 past the second contact surface 215, the repulsion force $F_n$ of the cam 200 caused by the elastic force of the spring 140 may be generated in a direction perpendicular to the tangent C between the roller 135 and the cam face 210. When the roller 135 is positioned at the inflection point 211, the repulsion force $F_n$ of the cam 200 due to the elastic force of the spring 140 may be such that it does not transmit any force to the door 30 in the direction of opening the door 30.

As the door 30 is further opened, as shown in FIG. 15, with the roller 135 of the lever device 100 positioned at the inflection point 211 and the spring 140 maximally compressed, the roller 135 of the lever device 100 may move beyond the inflection point 211. When the roller 135 of the lever device 100 exceeds the inflection point 211, the compressed spring 140 may be restored to the length before the spring was compressed and the lever 130 may be rotated clockwise about the rotation shaft 113 in the drawing. At this time, the roller 135 may be moved beyond the inflection point 211 and follow the shape of the second contact surface 215. When the elastic force of the spring 140 cause the lever 130 to rotate and the roller 135 is moved along the shape of the second contact surface 215 beyond the inflection point 211, the elastic force of the spring 140 may be transmitted to the door 30. In other words, the repulsion force $F_n$ of the cam 200 caused by the elastic force of the spring 140 generated in the direction perpendicular to the tangent C between the roller 135 and the cam face 210 may be transmitted to the door 30 in the direction in which the door 30 is opened. Accordingly, the door 30 may be completely opened by the opening force caused by the elastic force of the lever device 100 transmitted to the door 30. Since the door 30 is opened by the opening force by the elastic force of the lever device 100 after the door 30 is opened by a certain angle, the user may open the door 30 with a small force.

A refrigerator according to an embodiment of the present disclosure may include the main body 10, the storage room 20 disposed within the main body, the door 30 rotatably coupled to the main body to open or close the storage room, the lever device 100 mounted on the door and configured to accumulate an elastic force when the door is closed and transmit the accumulated elastic force in a direction of closing the door, and the cam 200 mounted on the main body and having the cam face 210 including the first contact surface 213 that is a section with which the lever device is in contact to accumulate the elastic force when the door is closed, the inflection point 211 that is a reference point for transmitting the accumulated elastic force to the door, and the second contact surface 215 that is a section in which the accumulated elastic force is transmitted to the door. The lever device may include the case 110, the lever 130 rotatably coupled to the inside of the case and rotated by contact with the cam face when the door is closed, and the spring 140 received in the case and compressed by the lever as the lever is rotated. According to the present disclosure, the elastic force of the spring 140 may be used to improve the closing force of the first door 31*a*. By using the elastic force of the spring 140, the lever 130 of the lever device 100 may be kept in contact with the cam face 210 and moved along the shape of the cam face 210 to improve the closing force of the first door 31*a*. By using the spring 140, the shape of the lever device may be formed to increase the opening angle α of the door when the roller 135 of the lever 130 is positioned at the inflection point 211 of the cam face 210 without constraining the shape of the lever device, thereby increasing the angle at which the first door 31*a* begins to close. As a result, when the first door is closed, the elastic force of the lever device 100 may be transmitted to the first door 31*a* before the frictional force is generated between the rotating bar 80 provided on the first door and the main body 10, so that the first door is completely closed without stopping during the closing process. By improving the closing force of the first door, the door may be closed with a small force. By utilizing the elastic force of the spring, it is possible to visibly identify whether the first door is open or closed.

The cam face may be formed to protrude towards the lever device on one surface of the cam with which the lever device contacts.

The first contact surface may be contacted before the lever is contacted with the inflection point when the door is closed, and the second contact surface may be contacted after the lever is contacted with the inflection point when the door is closed.

The door includes the first door 31*a* and the second door 31*b*, and the first door is coupled with the rotating bar 80 that rotates in response to the opening or closing of the first door and covers the gap between the first door and the second door.

The inflection point may be a portion that protrudes maximally from the cam face towards the lever device.

The lever device may further include the support mounted within the case to support the spring. According to the present disclosure, when one end of the spring 140 is supported on the secured support 120 to cause the lever 130 to rotate, the spring 140 may be compressed or restored to the length before being compressed, so that the elastic force of the spring may be transmitted to the door.

The case may include the support mounting groove 111 to which the support is mounted using the screw B, and the rotation shaft 113 to which the lever is rotatably secured. According to the present disclosure, when the lever 130 rotates about the rotation shaft 113, the spring 140 may be compressed or restored to its length before the spring was compressed, so that the elastic force of the spring may be transmitted to the first door.

The support may include the mounting hole 121 mounted in the support mounting groove by the screw and the first support protrusion 123 on which one end of the spring is supported. According to the present disclosure, when one end of the spring 140 is supported on the secured support 120 to cause the lever 130 to rotate, the spring 140 may be compressed or restored to the length before being compressed, so that the elastic force of the spring may be transmitted to the door.

The lever may include the rotation hole 131 rotatably secured to the rotation shaft, the second support protrusion 133 on which the other end of the spring is supported, the roller 135 that contacts the cam face to move along the shape of the cam face, and the roller mounting hole 137 on which the roller is mounted. According to the present disclosure, one end of the spring 140 is supported on the secured support 120 and the other end is supported on the rotating lever 130, so that when the lever rotates, the spring 140 may be compressed or restored to the length before being compressed. As a result, the elastic force of the spring may be transmitted to the door.

The roller may include the plurality of grooves 136 formed along the outer circumferential surface of the roller. According to the present disclosure, the plurality of grooves 136 may be formed on the outer circumferential surface of the roller 135, so that when the roller contacts the cam face 210, the contact area between the roller and the cam face may be reduced. As a result, the friction between the roller 135 and the cam face 210 may be reduced.

The roller may be moved along the shape of the cam face while maintaining contact with the cam face by an elastic force of the spring. According to the present disclosure, the closing force of the door 30 may be improved by using the elastic force of the spring 140 to allow the lever 130 of the lever device 100 to remain in contact with the cam face 210 and to move along the shape of the cam face 210.

The spring may be a compression spring. According to the present disclosure, the closing force of the door 30 may be improved by using the elastic force of the compression spring 140.

The lever may include the roller 135 in contact with the cam face, and when the door is closed, the roller may be contacted with the first contact surface and be moved along the first contact surface towards the inflection point.

The spring may be compressed by the rotation of the lever as the roller moves along the first contact surface.

When the roller passes the inflection point and moves along the second contact surface, the lever device can transmit the elastic force of the spring in the direction in which the door is closed.

A refrigerator according to an embodiment of the present disclosure may include the main body 10, the storage room 20 disposed within the main body, the door 30 rotatably coupled to the main body to open or close the storage room, the lever device 100 mounted on the door and configured to accumulate an elastic force when the door is closed, and the cam 200 mounted on the main body and having the cam face 210 with which the lever device contacts. The cam face may include the inflection point 211 that becomes a reference point for transmitting the elastic force accumulated by the compression spring to the door, the first contact surface 213 with which the lever device is contacted prior to contacting the inflection point, wherein the first contact surface is a section in which the lever device is moved along the first contact surface to cause the compression spring to accumulate the elastic force, and the second contact surface 215 with which the second contact surface is contacted after the lever device is contacted with the inflection point, wherein the second contact surface is a section in which the lever device moves along the second contact surface to transmit the elastic force accumulated by the compression spring to the door. According to the present disclosure, the closing force of the door 30 may be improved by using the elastic force of the compression spring 140. By using the compression spring 140, the size of the lever device may be reduced to increase the angle at which the door 30 begins to close, thereby improving the closing force of the door. By improving the closing force of the door, the door may be closed with a small force. The elastic force of the compression spring may be used to visibly identify whether the door is open or closed.

The lever device may further include the case 110 in which the compression spring is received, the support 120 mounted within the case and supporting one end of the compression spring, the lever 130 rotatably secured within the case and supporting the other end of the compression spring to rotate in contact with the cam face when the door is closed and compressing the compression spring. According to the present disclosure, the closing force of the door 30 may be improved by using the elastic force of the compression spring 140. By using the elastic force of the compression spring 140 to cause the lever 130 of the lever device 100 to maintain contact with the cam face 210 and move along the shape of the cam face 210, so that the closing force of the door 30 may be improved. By using the compression spring 140, the shape of the lever device may be freely changed so that the angle at which the door 30 begins to close may be increased. Accordingly, when the door is closed, the elastic force of the lever device 100 may be transmitted to the door 30 before any frictional force is generated between the rotating bar 80 provided in the door and the main body 10, so that the door may be fully closed without stopping during the closing process. By improving the closing force of the door, the door may be closed with a small force. The elastic force of the compression spring may be used to visibly identify whether the door is open or closed.

The lever may include a roller 135 contacted with the cam face and moved along the shape of the cam face, the roller being moved to maintain contact with the cam face by the elastic force of the compression spring when the door is closed. According to the present disclosure, the closing force of the door 30 may be improved by allowing the lever 130 of the lever device 100 to maintain contact with the cam face 210 and to be moved along the shape of the cam face 210 using the elastic force of the compression spring 140.

The roller may include the plurality of grooves 136 formed along the outer circumferential surface of the roller. According to the present disclosure, by forming the plurality of grooves 136 on the outer circumferential surface of the roller 135, the contact area between the roller and the cam face may be reduced when the roller is in contact with the cam face 210. As a result, the frictional force between the roller 135 and the cam face 210 may be reduced.

A refrigerator according to an embodiment of the present disclosure may include the main body 10, the storage room 20 disposed within the main body, the door 30 rotatably coupled to the main body to open or close the storage room, the lever device 100 mounted on the door and configured to accumulate an elastic force when the door is closed and transmit the accumulated elastic force in a direction of closing the door, and the cam 200 mounted on the main body and allowing the lever device to contact and accumulate the elastic force when the door is closed. The lever device may include the case 110, the support 120 mounted inside the case, the lever 130 rotatably secured inside the case and rotating in contact with the cam face when the door is closed, and the spring 140 disposed between the support and the lever and compressed when the lever is rotated. According to the present disclosure, the elastic force of the spring 140 may be used to improve the closing force of the door 30. By using the elastic force of the spring 140, the lever 130 of the lever device 100 may remain in contact with the cam face 210 and may be moved along the shape of the cam face 210 to improve the closing force of the door 30. By using the spring 140, the shape of the lever device may be freely changed so that the angle at which the door 30 begins to close is increased, thereby improving the closing force of the door. By improving the closing force of the door, the door may be closed with less force. The elastic force of the spring may be used to visibly identify whether the door is open or closed.

The effects to be obtained from the present disclosure are not limited to those mentioned above, and other effects not mentioned will be apparent to those of skilled in the art to which the present disclosure belongs from the following description.

While the present disclosure has been particularly described with reference to exemplary embodiments, it should be understood by those of skilled in the art that various changes in form and details may be made without departing from the spirit and scope of the present disclosure.

The invention claimed is:

1. A refrigerator comprising:
a main body;
a storage room in the main body;
a door couplable to the main body so that, while the door is coupled to the main body, the door is rotatable to open and close the storage room;
a lever device mountable on the door and including:
a case,
a lever including:
a first end, and
a second end couplable to the case so that, while the second end is coupled to the case, the lever is rotatable about the second end, and
a spring arrangeable inside the case and couplable to the lever so that, while the spring is coupled to the lever, the spring is compressed and expanded along a direction of a longitudinal length of the spring according to a rotation of the lever;
a cam mountable on the main body and including a cam face, and the cam face including:
a first contact surface,
a second contact surface, and
an inflection point between the first contact surface and the second contact surface;
wherein, while the lever device is mounted on the door and the cam is mounted on the main body, the lever device and the cam are configured so that:
while the door is being rotated to close the storage room, the first end of the lever contacts the cam and is moved along the cam face such that:
the first end of the lever is moved along the first contact surface and the lever is rotated in a first direction so as to compress the spring and accumulate an elastic force in the lever device,
after the first end of the lever is moved along a length of the first contact surface, the first end of the lever contacts the inflection point, and
after the first end of the lever contacts the inflection point, the first end of the lever is moved along the second contact surface and the lever is rotated in a second direction, opposite to the first direction, so that the spring decompresses and the accumulated elastic force is transmitted to the door in a direction of rotating the door to close the storage room.

2. The refrigerator of claim 1, wherein
the cam face protrudes toward the lever device.

3. The refrigerator of claim 2, wherein
the door is rotatable to a position at which the first end of the lever does not contact the cam while the storage room is open.

4. The refrigerator of claim 1, wherein
the door includes:
a first door,
a second door, and
a rotating bar coupled with the first door to rotate, in response to the first door rotating to open and close the storage room, so as to cover a gap between the first door and the second door while the storage room is closed.

5. The refrigerator of claim 1, wherein
the inflection point is a portion of the cam face that protrudes maximally towards the lever device.

6. The refrigerator of claim 1, wherein
the lever device includes a support mounted within the case and supporting the spring.

7. The refrigerator of claim 6, wherein
the case includes:
a support mounting groove to which the support is mounted, and
a rotation shaft to which the second end of the lever is coupled so that the lever is rotatable about the rotation shaft.

8. The refrigerator of claim 7, wherein
the support includes:
a mounting hole in the support to receive a securing member, and
a first support protrusion on which a first end of the spring is supported.

9. The refrigerator of claim 8, wherein
the lever includes:
a rotation hole through which the rotation shaft extends,
a second support protrusion on which a second end of the spring is supported, and
a roller at the first end of the lever to contact the cam face and move along the cam face.

10. The refrigerator of claim 9, wherein
the roller includes a plurality of grooves along an outer circumferential surface of the roller.

11. The refrigerator of claim 9, wherein
the spring elastically biases the lever so that the roller maintains contact with the cam face while the roller is moved along the cam face.

12. The refrigerator of claim 1, wherein
the spring is a compression spring.

13. The refrigerator of claim 1, wherein
the lever includes a roller at the first end of the lever and in contact with the cam face while the first end of the lever moves along the cam face, and
while the door is being rotated to close the storage room, the roller is in contact with the first contact surface and is moved along the first contact surface towards the inflection point.

14. The refrigerator of claim 13, wherein
the spring is compressed by rotation of the lever while the roller is moved along the first contact surface.

15. The refrigerator of claim 14, wherein
when the roller passes the inflection point and is moved along the second contact surface, the lever device is configured to transmit the accumulated elastic force to the door in a direction of rotating the door to close the storage room.

* * * * *